United States Patent
Yasui et al.

(10) Patent No.: US 8,813,477 B2
(45) Date of Patent: Aug. 26, 2014

(54) EXHAUST PURIFICATION SYSTEM FOR INTERNAL COMBUSTION ENGINE

(75) Inventors: Yuji Yasui, Saitama (JP); Kazuo Yanada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 849 days.

(21) Appl. No.: 12/917,179

(22) Filed: Nov. 1, 2010

(65) Prior Publication Data
US 2011/0099985 A1    May 5, 2011

(30) Foreign Application Priority Data
Nov. 2, 2009 (JP) .................................. 2009-252028

(51) Int. Cl.
F01N 3/00 (2006.01)
F01N 3/10 (2006.01)
F01N 3/20 (2006.01)

(52) U.S. Cl.
CPC ......... F01N 3/208 (2013.01); F01N 2900/1622 (2013.01); F01N 2560/021 (2013.01); Y02T 10/24 (2013.01); F01N 2900/1616 (2013.01); F01N 2900/1402 (2013.01); F01N 2900/0411 (2013.01)
USPC .................. 60/286; 60/276; 60/277; 60/295; 60/301; 60/303

(58) Field of Classification Search
CPC .............. F01N 3/208; F01N 2560/021; F01N 2900/1616; F01N 2900/1402; F01N 2900/1622; F01N 2900/0411; Y02T 10/24
USPC .............................. 60/276, 286, 295, 301, 303
See application file for complete search history.

(56) References Cited

U.S. PATENT DOCUMENTS

| | | | |
|---|---|---|---|
| 6,981,368 B2 * | 1/2006 | van Nieuwstadt et al. | 60/277 |
| 7,886,527 B2 * | 2/2011 | Solbrig | 60/286 |
| 2007/0204600 A1 | 9/2007 | Kubinski et al. | |

FOREIGN PATENT DOCUMENTS

| | | |
|---|---|---|
| DE | 10 2008 017 543 A1 | 10/2008 |
| DE | 10 2007 040 439 A1 | 3/2009 |
| JP | 2000-177741 A | 6/2000 |
| JP | 2003-129829 A | 5/2003 |
| JP | 2004-100700 A | 4/2004 |
| JP | 2004-517249 A | 6/2004 |

(Continued)

OTHER PUBLICATIONS

Decision to Grant issued to JP Application No. 2009-252028, mailed Jun. 19, 2012.

*Primary Examiner* — Thomas Denion
*Assistant Examiner* — Diem Tran
(74) *Attorney, Agent, or Firm* — Squire Patton Boggs (US) LLP

(57) ABSTRACT

An exhaust purification system is provided that can continuously maintain a NOx purification rate to be high while suppressing the occurrence of ammonia slip. The exhaust purification system includes a slip determination portion 34 that determines the occurrence of ammonia slip based on an output value $NH3_{CONS}$ of an ammonia sensor 26. A reference injection amount calculating portion 31 calculates a reference injection amount $G_{UREA\_BS}$ based on a parameter correlating to an operating state of an engine. A switching injection amount calculating portion 32 decreases in amount a urea injection amount $G_{UREA}$ by setting a switching injection amount $G_{UREA\_SW}$ to a negative value in response to having determined that ammonia slip has occurred, and increases in amount the injection amount $G_{UREA}$ by setting the switching injection amount $G_{UREA\_SW}$ to a positive value in response to a storage amount estimated value $ST_{UREA}$ having fallen below a predetermined switch storage amount $ST_{UREA\_SW}$.

5 Claims, 17 Drawing Sheets

(56) References Cited

FOREIGN PATENT DOCUMENTS

| | | |
|---|---|---|
| JP | 2004-293489 A | 10/2004 |
| JP | 2006-125247 A | 5/2006 |
| JP | 2006-274986 A | 10/2006 |
| JP | 2008-291739 A | 12/2008 |
| JP | 2010-77812 A | 4/2010 |
| WO | WO 02/053888 A1 | 7/2002 |
| WO | WO 2009/128189 A1 | 10/2009 |

* cited by examiner

EXHAUST PURIFICATION SYSTEM FOR INTERNAL COMBUSTION ENGINE

This application is based on and claims the benefit of priority from Japanese Patent Application No. 2009-252028, filed on 2 Nov. 2009, the content of which is incorporated herein by reference.

BACKGROUND OF THE INVENTION

1. Field of the Invention

The present invention relates to an exhaust purification system for an internal combustion engine, and particularly relates to an exhaust purification system for an internal combustion engine equipped with a selective reduction catalyst that reduces NOx in the exhaust under the presence of a reducing agent.

2. Related Art

Conventionally, as one exhaust purification system that purifies NOx in exhaust, a system has been proposed in which a selective reduction catalyst that selectively reduces NOx in the exhaust by way of a reducing agent is provided in an exhaust channel. For example, with an exhaust purification system of urea addition type, urea water is supplied from an upstream side of the selective reduction catalyst, ammonia is generated by thermal decomposition or hydrolysis of this urea water by the heat of the exhaust, and the NOx in the exhaust is selectively reduced by this ammonia. In addition to such a system of urea addition type, for example, a system has also been proposed that generates ammonia by heating a compound of ammonia such as ammonia carbide, and directly adds this ammonia. A system of urea addition type will be explained hereinafter.

With such a selective reduction catalyst, in a case of the injection amount of urea water being less than an optimum amount, the NOx purification rate declines from the ammonia being consumed in the reduction of NOx being insufficient, and in a case of being larger than this optimum amount, the ammonia that has become surplus in the reduction of NOx is discharged. As a result, appropriately controlling the injection amount of urea water has been important in exhaust purification systems provided with a selective reduction catalyst. Therefore, in Patent Document 1 and Patent Document 2, systems are exemplified that estimate a NOx purification rate of the selective reduction catalyst, and control an injection amount of urea water based on this estimation.

With the exhaust purification system disclosed in Japanese Unexamined Patent Application Publication No. 2004-100700 (hereinafter referred to as Patent Document 1), the NOx amount on a downstream side of the selective reduction catalyst is detected by a NOx sensor, and the composition of the exhaust flowing into the selective reduction catalyst, more specifically, the ratio of NO and $NO_2$, is estimated from the output value of this NOx sensor and the operating state of the internal combustion engine. Furthermore, based on this composition of the exhaust, the NOx purification rate of the selective reduction catalyst is estimated and the injection amount of urea water is controlled.

In addition, with the exhaust purification system disclosed in Japanese Unexamined Patent Application Publication No. 2006-274986 (hereinafter referred to as Patent Document 2), the temperature of the catalyst is detected as an amount relating to the NOx purification rate of the selective reduction catalyst, and the injection amount of urea water is controlled based on this temperature.

However, the NOx reduction rate of the selective reduction catalyst changes not only by the above such composition of the exhaust and temperature of the selective reduction catalyst, but also according to the degradation state of the selective reduction catalyst. In addition, there is variability in purification performance between individual units. Therefore, it is difficult to always optimally control the injection amount of urea water with exhaust purification systems such as those exemplified in Patent Documents 1 and 2.

Consequently, a technique is considered below that more directly detects the NOx purification rate of the selective reduction catalyst, and controls the injection amount of urea water based on this.

FIG. 19 is a schematic diagram showing a configuration of a conventional exhaust purification system 80.

As shown in FIG. 19, an oxidation catalyst 83, a urea injection valve 85 that injects urea water as a reducing agent that is stored in a urea tank 84 into an exhaust channel 82, and a selective reduction catalyst 86 that reduces NOx in the exhaust under the presence of ammonia are provided in sequence from an upstream side to a downstream side in the exhaust channel 82 of an engine 81. In addition, a temperature sensor 87 that detects a temperature of the selective reduction catalyst 86 and a NOx sensor 88 that detects a NOx amount on a downstream side of the selective reduction catalyst 86 are provided as sensors for observing the purification performance of the selective reduction catalyst.

With this exhaust purification system 80, for example, the NOx amount of exhaust discharged from the engine 81 is estimated by way of a map set in advance, and the injection amount of urea water from the urea injection valve 85 is determined based on this NOx amount and the catalyst temperature detected by the temperature sensor 87. In particular, herein, the degradation state of the selective reduction catalyst 86 can be estimated based on a difference between an output value of the NOx sensor 88 and the NOx amount of exhaust thus estimated. With this exhaust purification system, the injection amount of urea water is corrected in accordance with the degradation state of the selective reduction catalyst 86 estimated in the above way.

SUMMARY OF THE INVENTION

FIG. 20 shows relationships between the NOx amount and ammonia amount in the exhaust downstream of the selective reduction catalyst and the output value of the NOx sensor for the aforementioned conventional exhaust purification system. More specifically, FIG. 20 shows, in sequence from the upper graph, relationships between the NOx amount of exhaust downstream of the selective reduction catalyst, the ammonia amount of exhaust downstream of the selective reduction catalyst, and the output value of the NOx sensor, with the urea water injection amount.

When the injection amount of urea water increases, the NOx purification rate of the selective reduction catalyst rises due to the ammonia generated in the selective reduction catalyst also increasing. As a result, the NOx amount downstream of the selective reduction catalyst decreases accompanying the injection amount of urea water increasing, as shown in FIG. 20. In addition, when exceeding the urea water injection amount shown by the star, the NOx amount is substantially constant irrespective of the urea water injection amount. In other words, urea water of the amount exceeding the star indicates being surplus relative to that reducing the NOx generated.

In addition, herein, the ammonia generated from the urea water that is surplus is not consumed in the reduction of NOx, and is either stored in the selective reduction catalyst or discharged to downstream of the selective reduction catalyst.

Therefore, as shown in FIG. 20, the ammonia amount of exhaust downstream of the selective reduction catalyst increases, when exceeding the injection amount of urea water indicated by the star. It should be noted that reducing agent discharging from the selective reduction catalyst to the downstream side thereof in this way is referred to hereinafter as "reducing agent slip", and in a case of using ammonia as the reducing agent in particular, is referred to as "ammonia slip".

Since the urea water injection amount indicated by the star in FIG. 20 can both minimize the NOx amount and ammonia amount in the above way, it is the optimum injection amount for this exhaust purification system.

However, as shown in FIG. 20, the output value of the NOx sensor shows a downward convex characteristic in which the output value of this optimum injection amount is a minimum point. This is because existing NOx sensors in the detection principles thereof are sensitive not only to NOx, but also to ammonia. Therefore, it is impossible to determine whether the injection amount of urea water is insufficient relative to the optimum injection amount or excessive, with only the output value from the NOx sensor.

Incidentally, in addition to the ability to reduce NOx under the presence of ammonia in the above way, the selective reduction catalyst has the ability to store ammonia.

FIG. 21 is a graph showing a relationship between a storage rate and NOx purification rate of the selective reduction catalyst. Herein, the storage rate refers to a proportion of the ammonia amount stored in the selective reduction catalyst relative to the maximum value thereof.

As shown in FIG. 21, the NOx purification rate of the selective reduction catalyst has a characteristic of increasing with higher storage rates. Therefore, in suppressing the occurrence of ammonia slip while maintaining the NOx purification to be high, it is desirable to control the storage rate of the selective reduction catalyst to the maximum value with high precision. However, since NOx sensors have the aforementioned such characteristics, it is difficult to continuously control the storage rate to the maximum value while suppressing the occurrence of ammonia slip, and thus the control system may also fail. As a result, with the conventional exhaust purification system using a NOx sensor, the occurrence of excessive ammonia slip is suppressed in exchange for a decline in NOx purification rate, by controlling the storage rate to approximately 15 to 30%.

The present invention was made taking into account of the aforementioned points, and provides an exhaust purification system for an internal combustion engine provided with a selective reduction catalyst, the system being able to continuously maintain the NOx purification rate of the selective reduction catalyst to be high, while suppressing the occurrence of reducing agent slip.

In order to achieve the above-mentioned object, the present invention provides an exhaust purification system for an internal combustion engine (e.g., the exhaust purification system 2 described later) equipped with a selective reduction catalyst (e.g., the selective reduction catalyst 23 described later) provided in an exhaust channel (e.g., the exhaust channel 11 described later) of the internal combustion engine (e.g., the engine 1 described later) that reduces NOx in exhaust flow through the exhaust channel under the presence of a reducing agent (e.g., the ammonia described later), and a reducing agent supply means (e.g., the urea injection device 25 described later) that supplies reducing agent or an additive (e.g., the urea water described later) serving as a source of the reducing agent. The exhaust purification system includes: a reducing agent detection means (e.g., the ammonia sensor 26 described later) for detecting a reducing agent amount or reducing agent concentration of exhaust in the exhaust channel on a downstream side of the selective reduction catalyst; a slip determination means (e.g., the slip determination portion 34) for determining ($F_{NH3\_SLIP}$) an occurrence of reducing agent slip in the selective reduction catalyst based on an output value ($NH3_{CONS}$) of the reducing agent detection means; a storage amount estimation means (e.g., the state estimation unit 35 described later) for calculating an estimated value ($ST_{UREA}$) of a storage amount, with an amount of reducing agent stored in the selective reduction catalyst as the storage amount; and a supply amount determination means (e.g., the reference injection amount calculating portion 31, switching injection amount calculating portion 32, and adder 33 described later) for determining a supply amount ($G_{UREA}$) of the reducing agent supply means, in which the supply amount determination means determines a supply amount by decreasing in amount, relative to a reference supply amount ($G_{UREA\_BS}$) calculated based on a parameter (e.g., the output value $NOX_{CONS}$ of the NOx sensor, engine revolution speed NE, and generated torque TRQ described later) correlating to an operating state of the internal combustion engine, in response to having determined that the reducing agent slip has occurred, and increasing in amount in response to an estimated amount of the storage amount falling below a predetermined switch determination value ($ST_{UREA\_SW}$).

According to this invention, the reference supply amount for the supply amount of reducing agent or additive from the reducing agent supply means is calculated based on a parameter correlating to an operating state of the internal combustion engine. By configuring in such a way, the supply amount is determined by reducing in amount, relative to the reference supply amount calculated according to the operating state of the internal combustion engine, in response to having determined that reducing agent slip of the selective reduction catalyst has occurred, and increasing in amount in response to the estimated value of the storage amount having fallen below the switch determination value. With this, it is possible to continuously maintain the NOx purification rate of the selective reduction catalyst to be high, since the storage amount of the selective reduction catalyst can be controlled so as to oscillate between the switch determination value and the storage capacity, while supplying reducing agent of an amount required to purify the exhaust according to the operating state of the engine. In addition, at this time, since the occurrence of reducing agent slip of the selective reduction catalyst can be done intermittently, it is possible to control the occurrence of reducing agent slip while maintaining the NOx purification rate of the selective reduction catalyst to be high.

Incidentally, for the reducing agent detection means detecting the reducing agent amount or reducing agent concentration, the output characteristics, particularly the gain, vary due to components other than the reducing agent, such as $O_2$ and $H_2O$, in exhaust. As a result, in a case of determining the supply amount based on the output value of the reducing agent detection means, the supply amount may deviate from the optimum amount due to unexpected variation in the output characteristics of the reducing agent detection means, and may cause a decline in the NOx purification rate and the occurrence of excessive reducing agent slip.

Contrary to this, in the present invention, binary determination results output from the slip determination unit, and not the output value of the ammonia sensor itself, are used in order to determine the supply amount. Then, the slip determination means determines the existence of the occurrence of reducing agent slip, i.e. the existence of reducing agent in exhaust on a downstream side of the selective reduction catalyst, based on the output value of the reducing agent detection means. In addition, the determination results of such an existence of reducing agent are considered not to be greatly influenced by gain variation in the aforementioned such reducing agent detection means. Therefore, according to the present invention, it is possible to determine the supply amount without being affected by the gain variation of the reducing agent detection means.

In this case, it is preferable for the exhaust purification system to further include a storage capacity estimation means (e.g., the state estimation unit 35 and the storage capacity correction unit 36 described later) for calculating an estimated value ($ST_{UREA\_MAX}$) of a storage capacity, with an amount of reducing agent that can be stored by the selective reduction catalyst as the storage capacity, in which the switch determination value ($ST_{UREA\_SW}$) is set based on the estimated value ($ST_{UREA\_MAX}$) of the storage capacity.

According to this invention, the estimated value of the storage capacity, which is the amount of reducing agent that can be stored by the selective reduction catalyst, i.e. the maximum value of the storage amount, is calculated, and the above-mentioned switch determination value is set based on this estimated value of the storage capacity. With this, it is possible to control the occurrence of reducing agent slip to a minimum while stably maintaining the NOx purification rate to be high in accordance with the actual state of the selective reduction catalyst, since the switch determination value can be appropriately set depending on the storage capacity, which changes according to the temperature and extent of degradation.

In this case, it is preferably for the exhaust purification system to further include a slip estimation means (e.g., the state estimation unit 35 described later) for determining ($F_{NH3\_SLIP\_HAT}$) the occurrence of reducing agent slip based on the estimated value ($ST_{UREA}$) of the storage amount, in which the storage capacity estimation means corrects the estimated value of the storage capacity based on a difference between an occurrence time ($F_{NH3\_SLIP}=0\rightarrow1$) of reducing agent slip determined by way of the slip determination means and an occurrence time ($F_{NH3\_HAT}=0\rightarrow1$) of reducing agent slip determined by way of the slip estimation means.

According to this invention, the estimated value of the storage capacity is corrected according to the difference between the occurrence time of reducing agent slip determined based on the output value of the reducing agent detection means and the occurrence time of reducing agent slip determined based on the estimated value of the storage amount. With this, it is possible to further improve the stability of the NOx purification rate and the ability to suppress reducing agent slip, since the estimated value of the storage capacity can be brought to the actual storage capacity of the selective reduction catalyst, even in a case of material inconsistency and aging in the selective reduction catalyst and the reducing agent detection means.

In order to achieve the above-mentioned object, the present invention provides an exhaust purification system for an internal combustion engine (e.g., the exhaust purification system 2 described later) equipped with a selective reduction catalyst (e.g., the selective reduction catalyst 23 described later) provided in an exhaust channel (e.g., the exhaust channel 11 described later) of the internal combustion engine (e.g., the engine 1 described later) that reduces NOx in exhaust flow through the exhaust channel under the presence of a reducing agent (e.g., the ammonia described later), and a reducing agent supply means (e.g., the urea injection device 25 described later) that supplies reducing agent or an additive (e.g., the urea water described later) serving as a source of the reducing agent. The exhaust purification system includes: a reducing agent detection means (e.g., the ammonia sensor 26 described later) for detecting a reducing agent amount or reducing agent concentration of exhaust in the exhaust channel on a downstream side of the selective reduction catalyst; a storage amount estimation means (e.g., the state estimation unit 35 described later) for calculating an estimated value ($ST_{UREA}$) of a storage amount, with an amount of reducing agent stored in the selective reduction catalyst as the storage amount; a storage capacity estimation means (e.g., the state estimation unit 35 and the storage capacity correction unit 36 described later) for calculating an estimated value ($ST_{UREA\_MAX}$) of a storage capacity, with an amount of reducing agent that can be stored by the selective reduction catalyst as the storage capacity; a slip determination means (e.g., the slip determination portion 34 described later) for determining ($F_{NH3\_SLIP}$) an occurrence of reducing agent slip in the selective reduction catalyst based on an output value ($NH3_{CONS}$) of the reducing agent detection means; a slip estimation means (e.g., the state estimation unit 35 described later) for determining ($F_{NH3\_SLIP\_HAT}$) the occurrence of the reducing agent slip based on the estimated value ($ST_{UREA}$) of the storage amount; and a supply amount determination means (e.g., the reference injection amount calculating portion 31, switching injection amount calculating portion 32, and adder 33 described later) for determining a supply amount of the reducing agent supply means based on a parameter (e.g., output value $NOX_{CONS}$ of the NOx sensor, engine revolution speed NE, and generated torque TRQ described later) correlating to an operating state of the internal combustion engine, the estimated value ($ST_{UREA}$) of the storage amount, and the estimated value ($ST_{UREA\_MAX}$) of the storage capacity, in which the storage capacity estimation means corrects the estimated value of the storage capacity based on a difference between an occurrence time ($F_{NH3\_SLIP}=0\rightarrow1$) of reducing agent slip determined by way of the slip determination means and an occurrence time ($F_{NH3\_SLIP\_HAT}=0\rightarrow1$) of reducing agent slip determined by way of the slip estimation means.

According to this invention, the supply amount of the reducing agent or additive from the reducing agent supply means is determined based on a parameter correlating to the operating state of the internal combustion engine, the estimated value of the storage amount, and the estimated value of the storage capacity. With this, it is possible to control the storage amount of the selective reduction catalyst to near the storage capacity, while supplying reducing agent of an amount required to purify the exhaust according to the operating state of the engine.

In addition, according to this invention, the estimated value of the storage capacity is corrected according to the difference between the occurrence time of reducing agent slip determined based on the output value of the reducing agent detection means and the occurrence time of reducing agent slip determined based on the estimated value of the storage amount. With this, it is possible to bring the estimated value of the storage capacity to the actual storage capacity of the selective reduction catalyst, even in a case of material inconsistency or aging occurring in the selective reduction catalyst or reducing agent detection means. In this way, it is possible to suppress the occurrence of reducing agent slip, while maintaining the NOx purification rate of the selective reduction catalyst to be high, since reducing agent of an appropriate amount according to the state of the selective reduction catalyst can be supplied by determining the supply amount based on an estimated value close to the actual storage capacity.

In this case, it is preferable for a plurality of weighting functions (e.g., the weighting functions $W_i$ described later) and a plurality of correction values (e.g., the local correction values KVNS$_i$ described later) to be set for a plurality of regions (e.g., the regions 1, 2 and 3 described later) set for temperature of the selective reduction catalyst, and for the storage capacity estimation means to update the plurality of correction values based on a difference between an occurrence time of reducing agent slip determined by way of the slip determination means and an occurrence time of reducing agent slip determined by way of the slip estimation means, to set a sum total of products of the plurality of correction values thus updated and values of the plurality of weighting functions according to the temperature of the selective reduction catalyst as a correction coefficient (e.g., the storage capacity correction value KVNS), and to correct the estimated value of the storage capacity based on the correction coefficient.

According to this invention, the plurality of correction values set for the plurality of regions of the temperature of the selective reduction catalyst is updated based on the difference between the occurrence time of reducing agent slip determined by the slip determination means and the occurrence time of reducing agent slip determined by way of the slip estimation means. Then, a sum total of products of values of the plurality of weighting functions according to the temperature of the selective reduction catalyst and the above-mentioned plurality of correction values is set as a correction coefficient, and the estimated value of the storage capacity is corrected based on this correction coefficient. With this, it is possible to adaptively correct the correction value of the storage capacity so that the time for which reducing agent slip actually occurred and the estimated time for which reducing agent slip occurred are in agreement.

In this case, it is preferable for the exhaust purification system to further include a catalyst degradation determination means (e.g., the catalyst degradation determination unit 37 described later) for determining degradation of the selective reduction catalyst based on at least any of the estimated value (ST$_{UREA\_MAX}$) of the storage capacity, the plurality of correction values (KVNS$_i$), and the correction coefficient (KVNS).

According to this invention, it is possible for the operator to recognize that the selective reduction catalyst has degraded by determining degradation of the selective reduction catalyst.

DETAILED DESCRIPTION OF THE INVENTION

Figure 1:
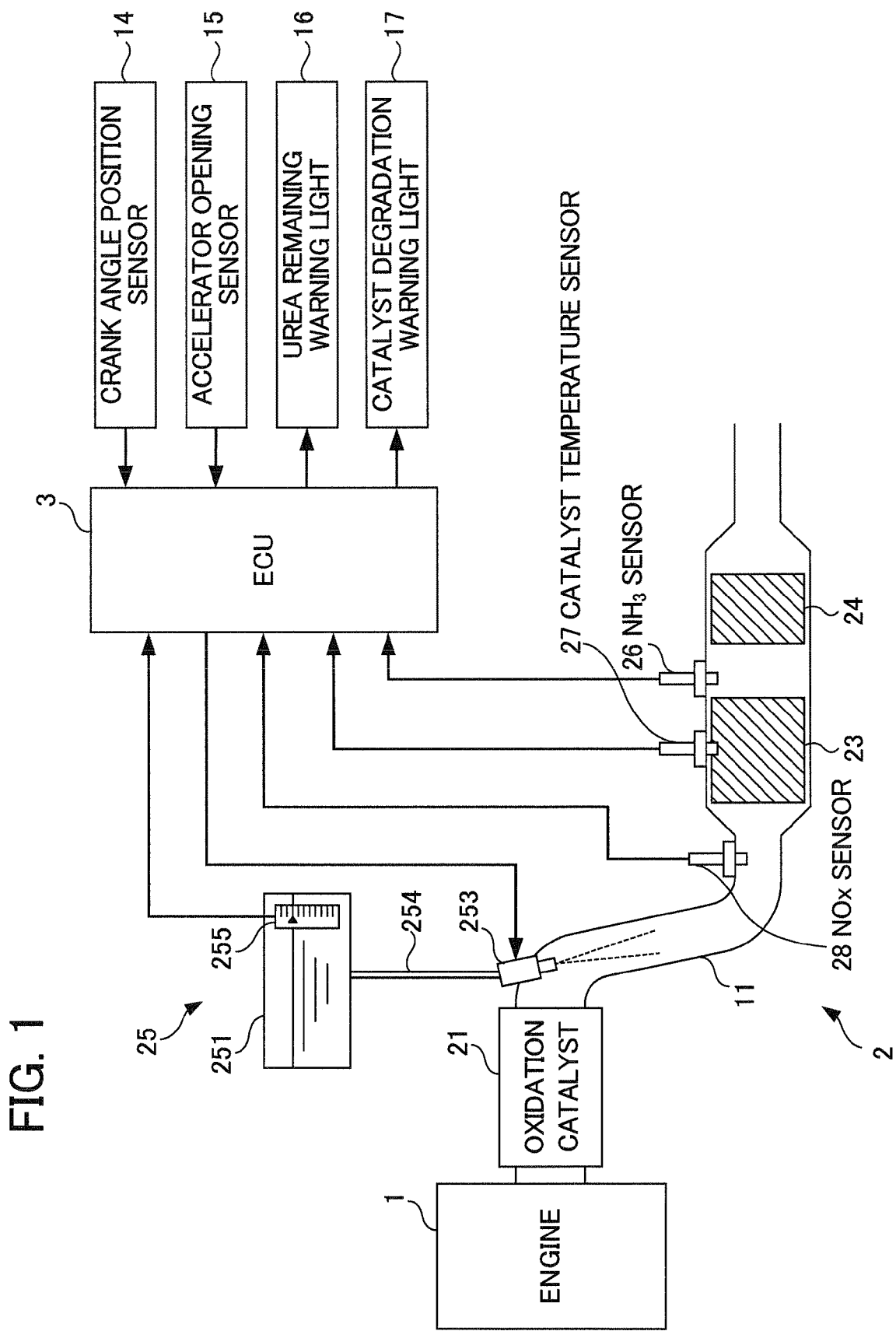
FIG. 1 is a schematic diagram showing a configuration of an engine and an exhaust purification apparatus thereof according to one embodiment of the present invention.

One embodiment of the present invention will be explained hereinafter while referring to the drawings.

FIG. 1 is a schematic diagraph showing configurations of an internal combustion engine (hereinafter referred to as "engine") 1 and an exhaust purification system 2 thereof according to one embodiment of the present invention. The engine 1 is a gasoline engine of lean-burn operating type or diesel engine, and is mounted in a vehicle, which is not illustrated.

The exhaust purification system 2 is configured to contain a selective reduction catalyst 23 that is provided in an exhaust channel 11 of the engine 1 and purifies nitrogen oxides (hereinafter referred to as "NOx") in exhaust flowing through this exhaust channel 11 under the presence of ammonia as a reducing agent, a urea injection device 25 that supplies urea water, which is a source of the reducing agent, into the exhaust channel 11 on an upstream side of the selective reduction catalyst 23, and an electronic control unit (hereinafter referred to as "ECU") 3. In addition to the selective reduction catalyst 23, an oxidation catalyst 21 and a slip suppressing catalyst 24 are provided in the exhaust channel 11.

The urea injection device 25 includes a urea tank 251 and a urea injection valve 253.

The urea tank 251 stores urea water, and is connected to the urea injection valve 253 a urea supply pipe 254 and a urea pump, which is not illustrated. A urea level sensor 255 is provided to this urea tank 251. This urea level sensor 255 detects the water level of the urea water in the urea tank 251, and outputs a detection signal substantially proportional to this water level to the ECU 3.

The urea injection valve 253 is connected to the ECU 3, operates according to a control signal from the ECU 3, and injects urea water into the exhaust channel 11 in accordance with this control signal. In other words, urea injection control is executed.

The oxidation catalyst 21 is provided more on an upstream side in the exhaust channel 11 than the urea selective reduction catalyst 23 and the urea injection valve 253, and converts a portion of NO in the exhaust to $NO_2$, thereby promoting reduction of NOx in the selective reduction catalyst 23.

The selective reduction catalyst 23 selectively reduces NOx in exhaust under an atmosphere in which a reducing agent such as ammonia is present. More specifically, when urea water is injected by the urea injection device 25, this urea water is thermally decomposed or hydrolyzed by the heat of exhaust, and ammonia is produced. The ammonia thus produced is supplied to the selective reduction catalyst 23, and NOx in the exhaust is selectively reduced by this ammonia.

This selective reduction catalyst 23 has a function of reducing NOx in exhaust by the ammonia produced from the urea water, as well as having a function of storing only a predetermined amount of the ammonia thus generated. Hereinafter, the ammonia amount stored in the selective reduction catalyst 23 is defined as a storage amount, and the ammonia amount that can be stored in the selective reduction catalyst 23 is defined as a storage capacity.

The ammonia stored in this way is also consumed as appropriate in the reduction of NOx in the exhaust. As a result, the NOx purification rate of the selective reduction catalyst 23 increases in accordance with the storage amount increasing. On the other hand, when the storage amount reaches the storage capacity and the selective reduction catalyst 23 enters a saturated state, although the NOx purification rate also reaches a maximum value, ammonia slip occurs in which the ammonia not contributing to the reduction of NOx and has become surplus is discharged to a downstream side of the selective reduction catalyst 23.

The slip suppressing catalyst 24 is provided in the exhaust channel 11 on a downstream side of the selective reduction catalyst 23, and in a case of ammonia slip in the selective reduction catalyst 23 having occurred, suppresses the ammonia having slipped from being discharged outside the system. For example, an oxidation catalyst that oxidizes ammonia having slipped from the selective reduction catalyst 23 to break down into $N_2$ and $H_2O$, a selective reduction catalyst that stores the ammonia having slipped, or the like can be used as this slip suppressing catalyst 24.

In addition to the ammonia sensor 26, the catalyst temperature sensor 27, and the NOx sensor 28, a crank angle position sensor 14, an accelerator opening sensor 15, a urea remaining amount warning light 16, and a catalyst degradation warning light 17 are connected to the ECU 3.

The ammonia sensor 26 detects the ammonia concentration $NH3_{CONS}$ of exhaust in the exhaust channel 11 between the selective reduction catalyst 23 and the slip suppressing catalyst 24, and supplies a detection signal substantially proportional to the ammonia concentration $NH3_{CONS}$ thus detected to the ECU 3.

The catalyst temperature sensor 27 detects a temperature (hereinafter referred to as "catalyst temperature") $T_{SCR}$ of the selective reduction catalyst 23, and supplies a detection signal substantially proportional to the catalyst temperature $T_{SCR}$ thus detected to the ECU 3.

The NOx sensor 28 detects a concentration of NOx in the exhaust (hereinafter referred to as "NOx concentration") $NOX_{CONS}$ flowing into the selective reduction catalyst 23, and supplies a detection signal substantially proportional to the NOx concentration $NOX_{CONS}$ thus detected to the ECU 3.

The crank angle position sensor 14 detects a rotation angle of the crank shaft of the engine 1 along with generating a pulse at every 1° of crank angle, and supplies this pulse signal to the ECU 3. A revolution speed NE of the engine 1 is calculated by the ECU 3 based on this pulse signal. The crank angle position sensor 14 further generates a cylinder discriminating pulse at a predetermined crank angle position of a specific cylinder, and supplies this to the ECU 3.

The accelerator opening sensor 15 detects a depression amount (hereinafter referred to as "accelerator opening") AP of the accelerator pedal, which is not illustrated, of the vehicle, and supplies a detection signal substantially proportional to the accelerator opening AP thus detected to the ECU 3. A demanded torque TRQ of the engine 1 is calculated in accordance with this accelerator opening AP and revolution speed NE by the ECU 3. Hereinafter, this demanded torque TRQ is set as a load parameter representing the load of the engine 1.

The urea remaining amount warning light 16 is provided in the instrument panel of the vehicle, for example, and illuminates in response to the remaining amount of urea water in the urea tank 251 having decreased past a predetermined remaining amount. With this, the fact that the remaining amount of urea water in the urea tank 251 has decreased is warned to the operator.

The catalyst degradation warning light 17 is provided in the instrument panel of the vehicle, for example, and illuminates in response to the selective reduction catalyst 23 having been determined by a catalyst degradation determination unit 37 described later to have degraded. With this, the fact that the selective reduction catalyst is in a degraded state is warned to the operator.

The ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, urea injection valve 253, and the like.

Next, a detailed configuration of a module that determines the urea injection amount $G_{UREA}$ (supply amount of urea water) by the urea injection valve will be explained. Prior to explaining the configuration of the module of the present embodiment in detail, two problems observed by the inventors of the present application each time performing urea injection control based on an output value $NH3_{CONS}$ of the ammonia sensor will be explained.

(1) Change in Storage Capacity of Selective Reduction Catalyst

Figure 2:
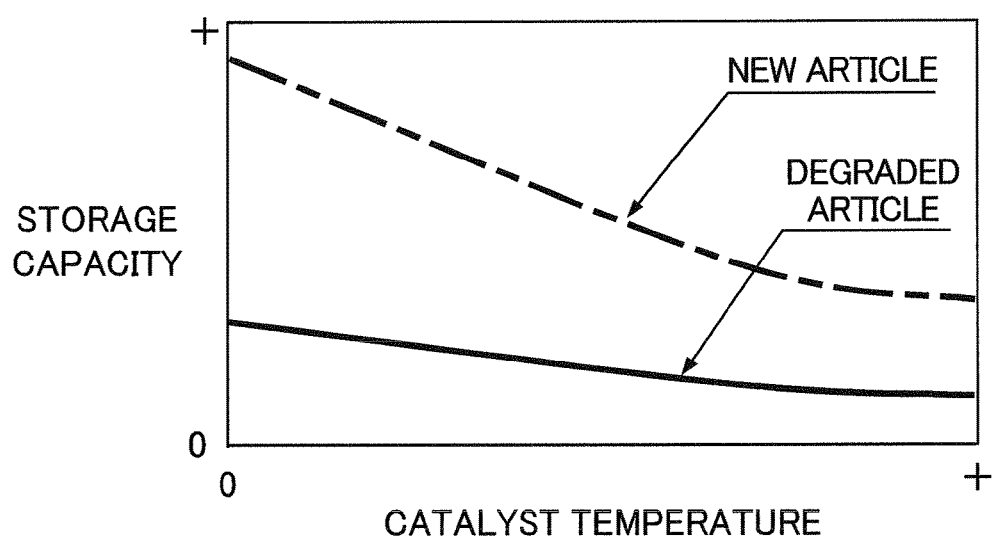
FIG. 2 is a graph showing temperature characteristics of a storage capacity of a selective reduction catalyst.

FIG. 2 is a graph showing temperature characteristics of the storage capacity of a selective reduction catalyst. In FIG. 2, the temperature characteristics of the new article are shown by the dot-dashed line, and the temperature characteristics of the degraded article are shown by the solid line.

It is necessary to continuously estimate the storage capacity with high precision to maintain a high NOx purification rate while suppressing the occurrence of ammonia slip. However, the storage capacity of the selective reduction catalyst has a characteristic of declining with rising catalyst temperature as shown in FIG. 2, and furthermore, this temperature characteristic changes so as to decline in response to the advancement of degradation of the catalyst.

(2) Gain Variation of Ammonia Sensor

Figure 3:
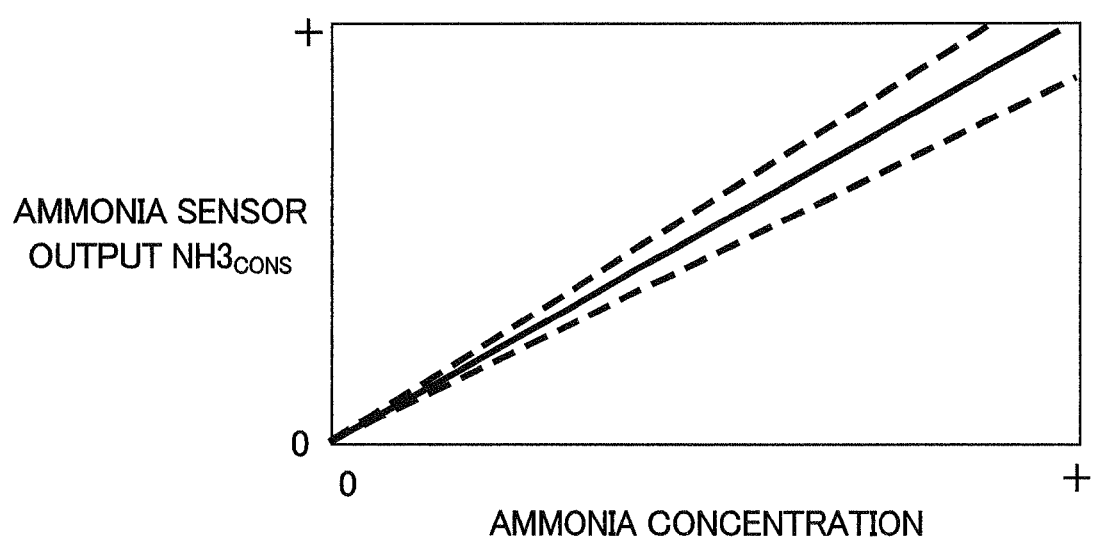
FIG. 3 is a graph showing output characteristics of an ammonia sensor.

FIG. 3 is a graph showing the output characteristic of the ammonia sensor.

As described above, although existing NOx sensors have sensitivity to not only NOx components in exhaust but also to ammonia component, it is possible to develop an ammonia sensor having no sensitivity to NOx, as exemplified in Japanese Unexamined Patent Application, Publication No. 2004-37378 and Japanese Unexamined Patent Application, Publication No. 2005-114355. Such ammonia sensors output a detection signal $NH3_{CONS}$ of a level substantially proportional to the ammonia concentration of exhaust, as shown in FIG. 3.

However, existing ammonia sensors are influenced by components ($O_2$, $H_2O$, etc.) other than ammonia in the exhaust, and there is a possibility for gain variation to arise, as shown by the dotted lines in FIG. 3. As a result, in a case of having performed urea injection control based on the output value of the ammonia sensor, the urea injection amount may deviate from the optimum amount depending on the gain variation of the ammonia sensor. In addition, when the gain of the sensor changes in this way, it becomes difficult to continuously estimate the storage capacity with high precision, as described above.

Figure 4:
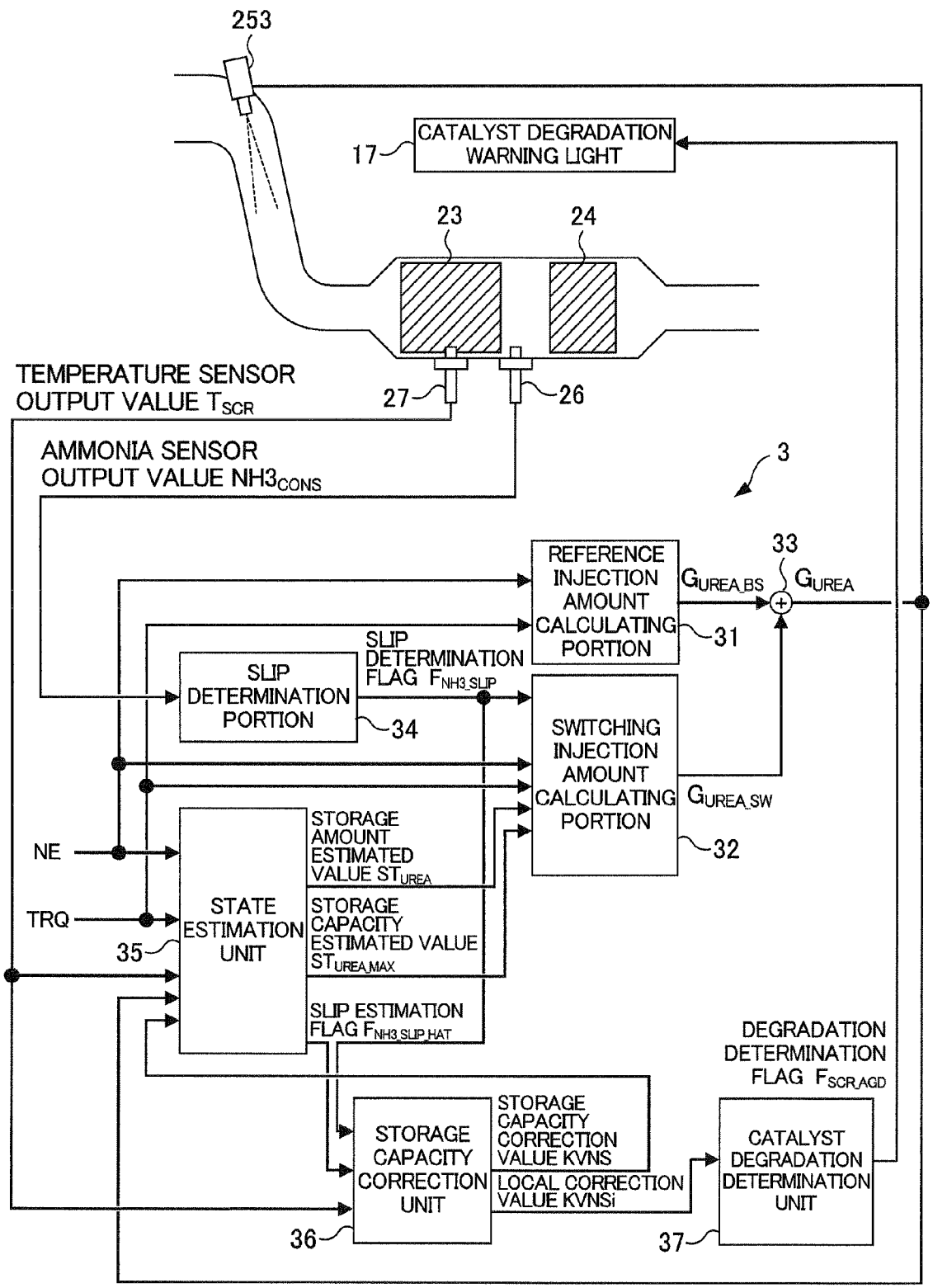
FIG. 4 is a block diagram showing a module configuration executing urea injection control according to the embodiment.

FIG. 4 is a block diagram showing a module configuration executing urea injection control of the present embodiment. This function is realized by the ECU 3 equipped with the above such hardware configuration.

With the urea injection control of the present embodiment, a reference injection amount $G_{UREA\_BS}$ to be the reference relative to overall injection amount is calculated by the reference injection amount calculating portion 31 described later, the reference injection amount $G_{UREA\_BS}$ is corrected by adding by way of an adder 33 the switching injection amount $G_{UREA\_SW}$ calculated by the switching injection amount calculating portion 32 described later, and the corrected reference injection amount determined as the urea injection amount $G_{UREA}$ (refer to the follow formula (1)).

$$G_{UREA}(k) = G_{UREA\_BS}(k) + G_{UREA\_SW}(k) \quad (1)$$

Herein, the notation (k) is a notation expressing computing time set synchronously with a urea injection cycle (e.g., 0.25 to 3.00 seconds). In other words, in a case of $G_{UREA}(k)$ being a urea injection amount in a current control timing, for example, $G_{UREA}(k-1)$ indicates being a urea injection amount in a control timing one cycle previous (previous time). It should be noted that the notation (k) is omitted as appropriate in the following explanation.

In addition, in order to solve the above-mentioned problem (1), the state of the selective reduction catalyst 23 is estimated by a state estimation unit 35 and a storage capacity correction unit 36 when calculating the reference injection amount $G_{UREA\_BS}$ and the switching injection amount $G_{UREA\_SW}$ by this reference injection amount calculating portion 31 and switching injection amount calculating portion 32. More specifically, the state estimation unit 35 and the storage capacity correction unit 36 respectively calculate the estimated values $ST_{UREA}$ and $ST_{UREA\_MAX}$ of the storage amount and storage capacity of the selective reduction catalyst 23, and perform output thereof to the switching injection amount calculating portion 32.

Consequently, in order to solve the above-mentioned problem (2) relating to the ammonia sensor 26, with this urea injection control, a signal converted via the slip determination portion 34 is used for the output value $NH3_{CONS}$ of the ammonia sensor 26.

In addition, with this urea injection control, degradation of the selective reduction catalyst 23 is determined by the catalyst degradation determination unit 37 based on the outputs of the state estimation unit 35 and the storage capacity correction unit 36.

Hereinafter, detailed configurations of each module of such urea injection control will be explained in order.

Configuration of Slip Determination Portion

Figure 5:
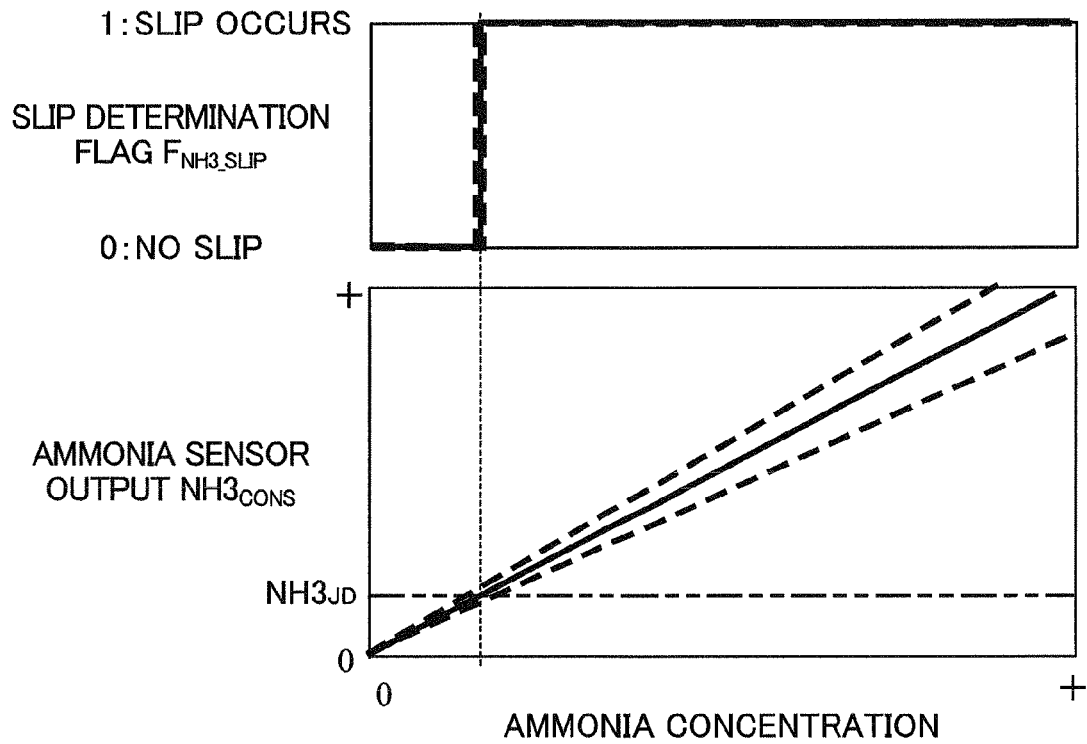
FIG. 5 is a graph showing behavior of a slip determination portion according to the embodiment.

FIG. 5 is a graph showing behavior of the slip determination portion 34.

The slip determination portion 34 determines the existence of ammonia downstream of the selective reduction catalyst, i.e. the occurrence of ammonia slip of the selective reduction catalyst, based on the output value $NH3_{CONS}$ of the ammonia sensor, and determines a slip determination flag $F_{NH3\_SLIP}$ indicating being a state in which ammonia slip has occurred. More specifically, as shown in FIG. 5, a threshold value $NH3_{JD}$ for the output value $NH3_{CONS}$ of the ammonia sensor is set to near a value 0. Then, in a case of the output value $NH3_{CONS}$ being smaller than the threshold value $NH3_{JD}$, ammonia slip is determined to not be occurring, and the slip determination flag $F_{NH3\_SLIP}$ is set to "0", and in a case of the output value $NH3_{CONS}$ being at least the threshold value $NH3_{JD}$, ammonia slip is determined to be occurring, and the slip determination flag $F_{NH3\_SLIP}$ is set to "1" (refer to the following formula (2)).

$$F_{NH3\_SLIP} = \begin{cases} 1: NH_3 \text{ SLIP OCUURS}(NH3_{CONS} \geq NH3_{JD}) \\ 0: NO\ NH_3\ SLIP(NH3_{CONS} < NH3_{JD}) \end{cases} \quad (2)$$

The error in the output value $NH3_{CONS}$ of the ammonia sensor becomes larger depending on the absolute value of the output value $NH3_{CONS}$, along with gain variation of the ammonia sensor. With this slip determination portion 34, it is possible to stably determine the occurrence of ammonia slip with high precision, irrespective of the gain variation of the ammonia sensor, by setting the threshold value $NH3_{JD}$ for the output value $NH3_{CONS}$ to near the value 0 at which the error is small.

Configuration of Reference Injection Amount Calculating Portion

With the reference injection amount calculating portion 31, the reference injection amount $G_{UREA\_BS}$ is calculated in order to inject urea water of an amount appropriate for the NOx amount discharged from the engine. More specifically, the reference injection amount calculating portion 31 calculates the reference injection amount $G_{UREA\_BS}$ by searching a predetermined control map, for example, based on a parameter correlating to an operating state of the engine, such as the engine revolution speed NE or a load parameter TRQ of the engine (refer to the following formula (3)).

Figure 6:
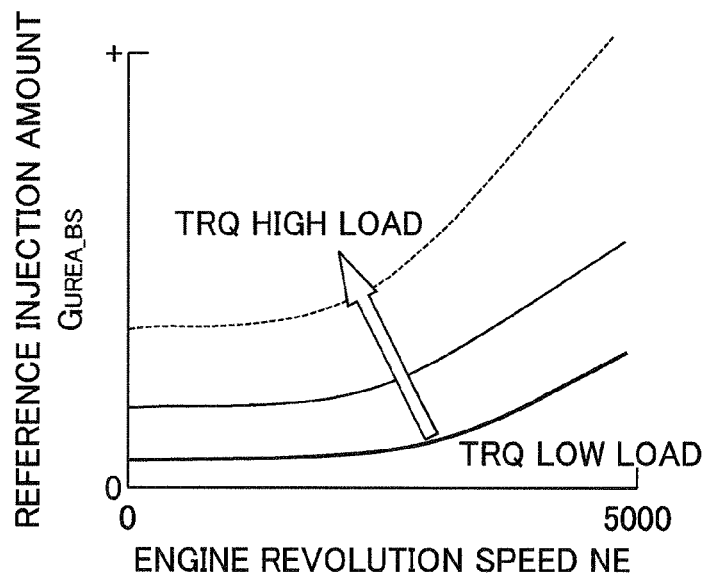
FIG. 6 is a graph showing an example of a control map for determining a reference injection amount according to the embodiment.

$G_{UREA\_BS}(k) \leftarrow$ calculated by searching the map
shown in FIG. 6, based on the engine load $TRQ$
(k) and the engine revolution speed $NE(k)$ \quad (3)

FIG. 6 is a graph showing an example of a control map for determining the reference injection amount $G_{UREA\_BS}$.

As shown in FIG. 6, with this control map, the reference injection amount $G_{UREA\_BS}$ is determined to be a larger value with the revolution speed NE of the engine or the load parameter TRQ increasing.

This is because the NOx emission amount increases by the combustion temperature of the air/fuel mixture rising with the load parameter TRQ of the engine increasing, and the NOx emission amount per unit time increases with the revolution speed NE of the engine rising. It should be noted that the fuel injection amount or the amount of new air in the cylinder may be used as the load parameter of the engine.

It should be noted that, in a case of having provided a NOx sensor that detects the NOx concentration of exhaust flowing into the selective reduction catalyst, as shown in FIG. 1, the reference injection amount $G_{UREA\_BS}$ may be calculated based on the output value $NOX_{CONS}$ of this NOx sensor as the parameter correlating to the operating state of the engine.

Configuration of Switching Injection Amount Calculating Portion

With the switching injection amount calculating portion 32, the switching injection amount $G_{UREA\_SW}$ to be the correction amount relative to the reference injection amount $G_{UREA\_BS}$ is calculated in order to inject urea water of an amount appropriate for keeping the storage amount of the selective reduction catalyst near the storage capacity. More specifically, the switching injection amount calculating portion 32 calculates the switching injection amount $G_{UREA\_SW}$ based on the slip determination flag $F_{NH3\_SLIP}$, as well as the estimated value $ST_{UREA}$ of the storage amount and the estimated value $ST_{UREA\_MAX}$ of the storage capacity calculated by the state estimation unit 35 and the storage capacity correction unit 36 described later.

With this switching injection amount calculating portion 32, a switch storage amount $ST_{UREA\_SW}$ described later is set to a value that is somewhat smaller than the estimated value $ST_{UREA\_MAX}$ of the storage capacity (refer to formulas (4) and (5) described later). Then, the switching injection amount $G_{UREA\_SW}$ is calculated so that the estimated value $ST_{UREA}$ of the storage amount falls between this estimated value $ST_{UREA\_MAX}$ of the storage capacity and the switch storage amount $ST_{UREA\_SW}$ (refer to formulas (6), (7) and (8) described later).

First, the sequence of setting the switch storage amount $ST_{UREA\_SW}$ will be explained.

Figure 7:
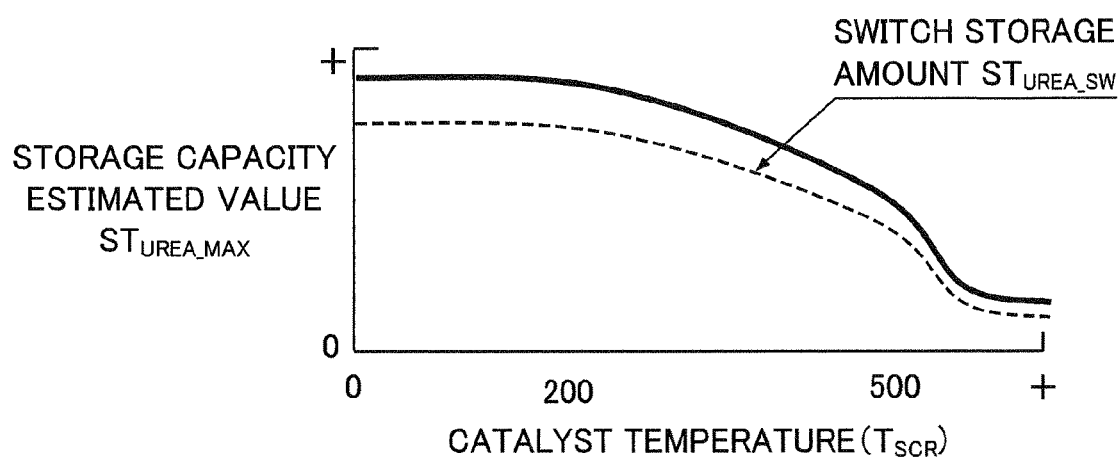
FIG. 7 is a graph schematically showing a relationship between an estimated amount of storage capacity and catalyst temperature according to the embodiment.

FIG. 7 is a graph schematically showing a relationship between the estimated value $ST_{UREA\_MAX}$ of the storage capacity and the catalyst temperature (output value $T_{SCR}$ of the catalyst temperature sensor). As shown in FIG. 7, the estimated value $ST_{UREA\_MAX}$ of the storage capacity of the selective reduction catalyst decreases with the catalyst temperature rising. For the estimated value $ST_{UREA\_MAX}$ of the storage capacity having such a characteristic, the switch storage amount $ST_{UREA\_SW}$ is set to a value that is somewhat smaller than the estimated value $ST_{UREA\_MAX}$ as shown by the dotted line in FIG. 7.

Figure 8:
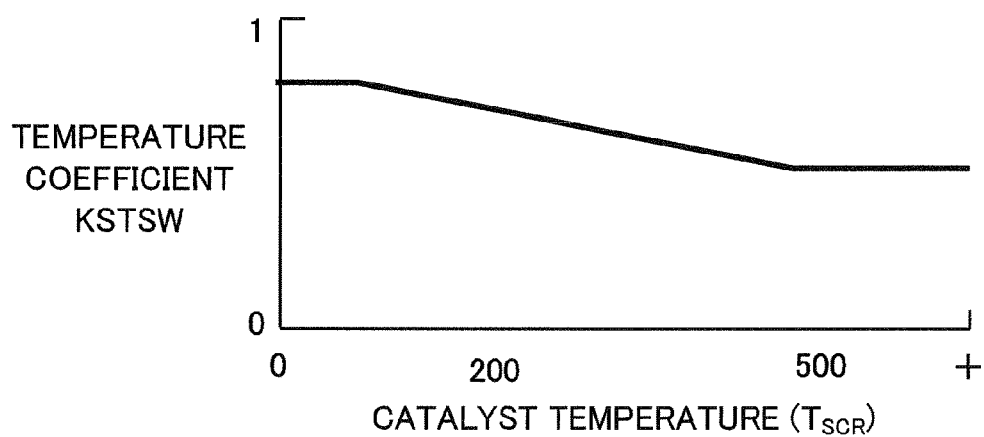
FIG. 8 is a graph showing an example of a control map for determining a temperature coefficient according to the embodiment.

More specifically, a temperature coefficient KSTSW is found by searching a control map such as that shown in FIG. 8, based on the output value $T_{SCR}$ of the catalyst temperature sensor (refer to the following formula (4)). As shown in FIG. 8, this temperature coefficient KSTSW is preferably determined between 0 and 1 so as to become larger in a temperature range in which the storage capacity is large, and then to become smaller in a temperature range in which the storage capacity is small.

$KSTSW(k) \leftarrow$ calculated by searching the map shown in FIG. 8, based on the output value $T_{SCR}$ of the catalyst temperature (4)

Therefore, as shown in the following formula (5), the product of multiplying the above-mentioned temperature coefficient KSTSW by the estimated value $ST_{UREA\_MAX}$ of the storage capacity is set as the switch storage amount $ST_{UREA\_SW}$.

$$ST_{UREA\_SW}(k) = KSTSW(k) ST_{UREA\_MAX}(k) \qquad (5)$$

With this, the difference between the estimated value $ST_{UREA\_MAX}$ of the storage capacity and the switch storage amount $ST_{UREA\_SW}$ is set so as to become smaller with the catalyst temperature rising, as shown by the dotted line in FIG. 7. With this, it is possible to continuously maintain a state in which the storage amount is near the storage capacity for a selective reduction catalyst having storage capacity that declines with the catalyst temperature rising.

It should be noted that the above-mentioned temperature coefficient KSTSW may be made constant, irrespective of the output value $T_{SCR}$ of the temperature sensor. In addition, not limiting to the above formula (5), the switch storage amount $ST_{UREA\_SW}$ may be set by subtracting a predetermined value from the estimated value $ST_{UREA\_MAX}$ of the storage capacity.

Next, an injection amount switching flag $F_{UREA\_SW}$ is determined based on the estimated value $ST_{UREA}$ of the storage amount, the switch storage amount $ST_{UREA\_SW}$, and the slip determination flag $F_{NH3\_SLIP}$, as shown in the following formula (6).

In other words, the injection amount switching flag $F_{UREA\_SW}$ is set to "1" from "0" in response to ammonia slip occurring in the selective reduction catalyst, and the slip determination flag $F_{NH3\_SLIP}$ having become "1" from "0".

Thereafter, the injection amount switching flag $F_{UREA\_SW}$ is reset to "0" from "1" in response to the estimated value $ST_{UREA}$ of the storage capacity having fallen below the above-mentioned switch storage amount $ST_{UREA\_SW}$.

$$F_{UREA\_SW}(k) = \begin{cases} 1: F_{NH3\_SLIP}(k) = 1 \text{ and } F_{UREA\_SW}(k-1) = 0 \\ 0: ST_{UREA}(k) \leq ST_{UREA\_SW}(k) \text{ and } F_{UREA\_SW}(k-1) = 1 \\ F_{UREA\_SW}(k-1): \text{ in other case} \end{cases} \qquad (6)$$

The switching injection amount $G_{UREA\_SW}$ is calculated as shown in the following formula (7), according to the injection amount switching flag $F_{UREA\_SW}$ determined in the above way.

In other words, in a case of the injection amount switching flag $F_{UREA\_SW}$ being "1", the injection amount of urea water is determined to be a slightly excessive state, and the product of multiplying the exhaust density $DEN_{EX}$ and the estimated value $V_{EX}$ of the exhaust volume by a negative predetermined supply-excess time correction value $G_{UREA\_SW\_UND}$ is determined as the switching injection amount $G_{UREA\_SW}$.

Then, in a case of the injection amount switching flag $F_{UREA\_SW}$ being "0", the injection amount of urea water is determined to be a slightly insufficient state, and the product of multiplying the exhaust density $DEN_{EX}$ and the estimated value $V_{EX}$ of the exhaust volume by a positive predetermined supply-deficient time correction value $G_{UREA\_SW\_OVD}$ is determined as the switching injection amount $G_{UREA\_SW}$.

$$G_{UREA\_SW}(k) = \begin{cases} G_{UREA\_SW\_UND} DEN_{EX} V_{EX}(k): F_{UREA\_SW}(k) = 1 \\ G_{UREA\_SW\_OVD} DEN_{EX} V_{EX}(k): F_{UREA\_SW}(k) = 0 \end{cases} \qquad (7)$$

-continued $G_{UREA\_SW\_UND}$: supply-excess time correction value ($G_{UREA\_SW\_UND} < 0$)

$G_{UREA\_SW\_OVD}$: supply-deficient time correction value ($G_{UREA\_SW\_OVD} > 0$)

$DEN_{EX}$: exhaust density (g/L)

With this, the reference injection amount $G_{UREA\_BS}$ is reduced in amount in response to ammonia slip having been determined to have occurred, after which it is increased in amount in response to the estimated value $ST_{UREA}$ of the storage capacity having fallen below the switch storage amount $ST_{UREA\_SW}$.

Figure 9:
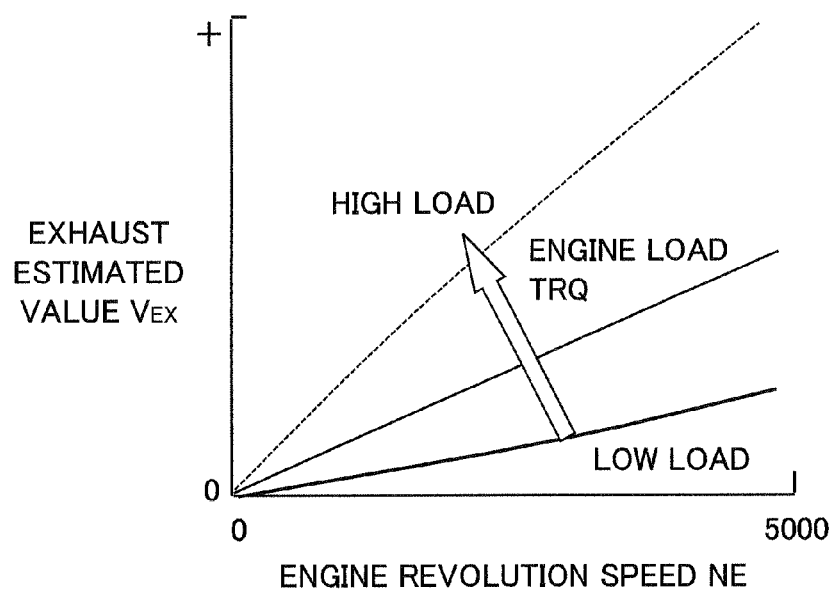
FIG. 9 is a graph showing an example of a control map for determining an estimated value of exhaust volume according to the embodiment.

Herein, the estimated value $V_{EX}$ of the exhaust volume is calculated by searching a predetermined control map, for example, based on the engine revolution speed NE or the load parameter TRQ (refer to the following formula (8)). As this control map for calculating the estimated value $V_{EX}$ of the exhaust volume, the map shown in FIG. 9 is used, for example.

$V_{EX}(k)$←TRQ calculated by searching the map shown in FIG. 8, based on the engine load $TRQ(k)$ and the engine revolution speed $NE(k)$ (8)

Figure 10:
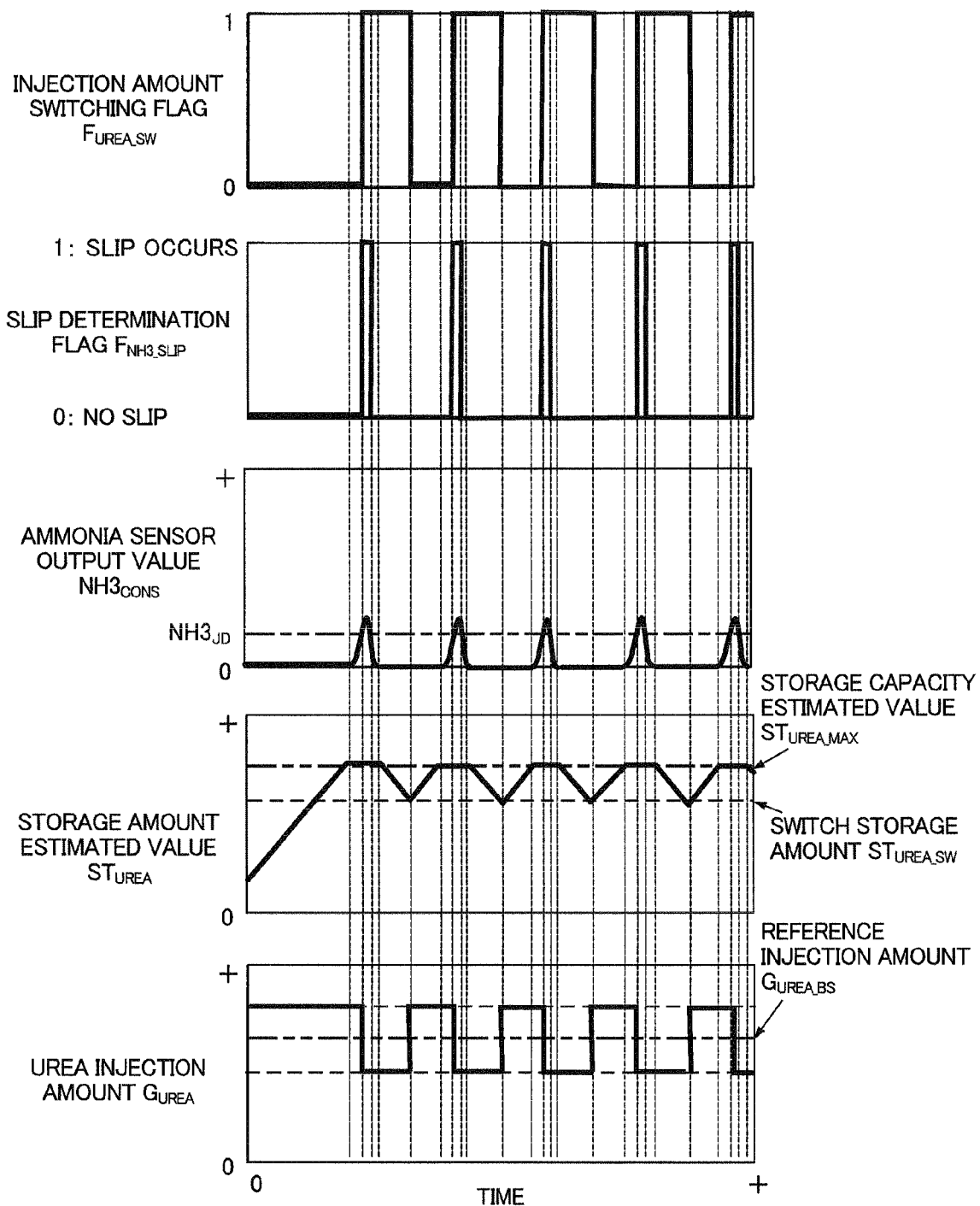
FIG. 10 presents time charts showing behavior of an injection switching flag, slip determination flag, ammonia sensor output value, storage amount estimated value, storage capacity estimated value, and urea injection amount.

FIG. 10 presents time charts showing behavior of the injection amount switching flag $F_{UREA\_SW}$, slip determination flag $F_{NH3\_SLIP}$, ammonia sensor output value $NH3_{CONS}$, storage amount estimated value $ST_{UREA}$, storage capacity estimated value $ST_{UREA\_MAX}$, and urea injection amount $G_{UREA}$. In FIG. 10, a case is shown in which the engine operating state is made constant, and the amount of NOx discharged from the engine is made constant.

Operation is started from a state in which ammonia is not being stored in the selective reduction catalyst.

Immediately after operation of the engine has been started, the slip determination flag $F_{NH3\_SLIP}$ and the injection amount switching flag $F_{UREA\_SW}$ are "0", and thus the switching injection amount $G_{UREA\_SW}$ is set to a positive value. As a result, the urea injection amount $G_{UREA}$ becomes an amount correcting the reference injection amount $G_{UREA\_BS}$ to the increased amount side.

Thereafter, the estimated value $ST_{UREA}$ of the storage amount increases, and when it reaches the estimated value $ST_{UREA\_MAX}$ of the storage capacity, the output value $NH3_{CONS}$ of the ammonia sensor begins to increase. Ammonia slip is determined to have occurred and the slip determination flag $F_{NH3\_SLIP}$ is set to "1" in response to the output value $NH3_{CONS}$ of the ammonia sensor having exceeded the threshold value $NH3_{JD}$. At this time, the injection amount switching flag $F_{UREA\_SW}$ is set to "1" while the switching injection amount $G_{UREA\_SW}$ is simultaneously set to a negative value. With this, the urea injection amount $G_{UREA}$ becomes an amount correcting the reference injection amount $G_{UREA\_BS}$ to the reduced amount side.

By correcting the urea injection amount $G_{UREA}$ to the reduced amount side, the ammonia sensor output value $NH3_{CONS}$ begins to decrease. In response to having determined that the ammonia sensor output value $NH3_{CONS}$ has fallen below the threshold value $NH3_{JD}$, it is determined that the ammonia slip has come down, and the slip determination flag $F_{NH3\_SLIP}$ is reset to "0".

Thereafter, in response to having determined that the estimated value $ST_{UREA}$ of the storage amount has begun to decrease from the storage capacity estimated value $ST_{UREA\_MAX}$, and the estimated value $ST_{UREA}$ of the storage amount having fallen below the switch storage amount $ST_{UREA\_SW}$, the injection amount switching flag $F_{UREA\_SW}$ is reset to "0" and the switching injection amount $G_{UREA\_SW}$ is set again to a positive value. With this, the urea injection amount $G_{UREA}$ becomes an amount correcting the reference injection amount $G_{UREA\_BS}$ to the increased amount side.

More specifically, in the above way, with the urea injection control of the present embodiment, the urea injection amount $G_{UREA}$ is alternately corrected to the increased amount side and reduced amount side relative to the reference injection amount $G_{UREA\_BS}$, so that the storage amount estimated value $ST_{UREA}$ oscillates between the storage capacity estimated value $ST_{UREA\_MAX}$ and the switch storage amount $ST_{UREA\_SW}$.

Configuration of State Estimation Unit

With the state estimation unit 35, the estimated value $ST_{UREA}$ of the storage amount and the estimated value $ST_{UREA\_MAX}$ indicating the state of the selective reduction catalyst are calculated, and a slip estimation flag $F_{NH3\_SLIP\_HAT}$ for determining the occurrence of ammonia slip is determined based on these estimated values $ST_{UREA}$ and $ST_{UREA\_MAX}$.

The estimated value $ST_{UREA\_MAX}$ of the storage capacity is calculated in the following sequence.

First, a reference value $ST_{UREA\_MAX\_BS}$ of the storage capacity is calculated by searching a predetermined control map, for example, based on the output value $T_{SCR}$ of the catalyst temperature sensor (refer to the following formula (9)).

Figure 11:
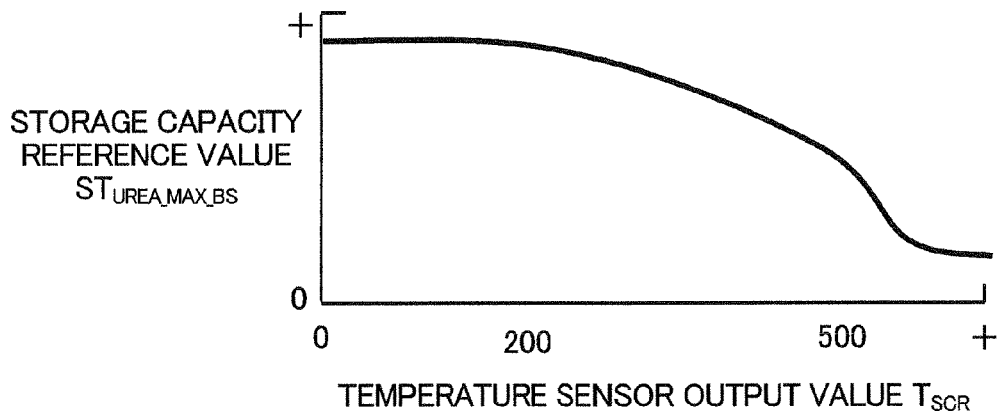
FIG. 11 is a graph showing an example of a control map for determining a reference value of the storage capacity according to the embodiment.

$ST_{UREA\_MAX\_BS}(k)$←calculated by searching the map shown in FIG. 11, based on the output value $T_{SCR}$ of catalyst temperature sensor (9)

FIG. 11 is a graph showing an example of a control map for determining the reference value $ST_{UREA\_MAX\_BS}$ of the storage capacity. As shown in FIG. 11, with this control map, the reference value $ST_{UREA\_MAX\_BS}$ of the storage capacity is set so as to become smaller with the catalyst temperature rising, in accordance with the characteristics of the selective reduction catalyst.

Next, the product of multiplying a storage capacity correction value KVNS by the reference value $ST_{UREA\_MAX\_BS}$ thus calculated is set as the estimated value $ST_{UREA\_MAX}$ of the storage capacity, as shown in the following formula (10). Herein, the storage capacity correction value KVNS corrects the reference value $ST_{UREA\_MAX\_BS}$ by multiplying by this, is a value for causing the estimated value $ST_{UREA\_MAX}$ of the storage capacity to adaptively change, and is calculated by the storage capacity correction unit 36 described later. In addition, the notation (n) indicates the computing time of the storage capacity correction unit 36 described later.

$ST_{UREA\_MAX}(k)=KVNS(n)ST_{UREA\_MAX\_BS}(k)$ (10)

It should be noted that, although the storage capacity correction value KVNS was multiplied by the reference value $ST_{UREA\_MAX\_BS}$ in the present embodiment, it is not limited thereto, and may be added.

The estimated value $ST_{UREA}$ of the storage amount is calculated in the following sequence.

First, among the ammonia generated by injection from the urea injection device and hydrolysis, a portion not contributing to the reduction of NOx is stored in the selective reduction catalyst. Therefore, at the current control time, ammonia corresponding to an amount arrived at by subtracting the reference injection amount $G_{UREA\_BS}(k)$ from the overall urea injection amount $G_{UREA}(k)$ is stored in the selective reduction catalyst. In addition, there is a lower limit value (value 0)

and an upper limit value (storage capacity) for the amount of ammonia stored in the selective reduction catalyst.

Therefore, as shown in the following formula (11), a temporary value $ST_{UREA\_TEMP}(k)$ of the storage amount estimated value is calculated by adding a current stored portion ($G_{UREA}(k)-G_{UREA\_BS}(k)$) to a previous value $ST_{UREA}(k-1)$ of the storage amount estimated value, and as shown in the following formula (12), the estimated value $ST_{UREA}(k)$ of the storage amount can be determined by conducting limit processing of the upper limit value and the lower limit value on this temporary value $ST_{UREA\_TEMP}(k)$.

$$ST_{UREA\_TEMP}(k) = ST_{UREA}(k-1) + G_{UREA}(k) - G_{UREA\_BS}(k) \quad (11)$$

$$ST_{UREA}(k) = \begin{cases} ST_{UREA\_MAX}(k): & (ST_{UREA\_MAX}(k) \leq ST_{UREA\_TEMP}(k)) \\ ST_{UREA\_TEMP}(k): & (0 < ST_{UREA\_TEMP}(k) < ST_{UREA\_MAX}(k)) \\ 0: & (ST_{UREA\_TEMP}(k) \leq 0) \end{cases} \quad (12)$$

The slip estimation flag $F_{NH3\_SLIP\_HAT}$ estimating the occurrence of ammonia slip is set in the following sequence. It should be noted that two variations are considered for the specific sequence of determining this slip estimation flag $F_{NH3\_SLIP\_HAT}$. Hereinafter, sequences of the two variations of TYPE 1 and TYPE 2 will each be explained.

TYPE 1

Since ammonia slip occurs by the storage amount in the selective reduction catalyst exceeding the storage capacity, the slip estimation flag $F_{NH3\_SLIP\_HAT}$ can be determined by comparing the sizes of the storage amount estimated value $ST_{UREA}$ and the storage capacity estimated value $ST_{UREA\_MAX}$, as shown in the following formula (13).

$$F_{NH3\_SLIP\_HAT}(k) = \begin{cases} 1: & ST_{UREA}(k) \geq ST_{UREA\_MAX}(k) \\ 0: & ST_{UREA}(k) < ST_{UREA\_MAX}(k) \end{cases} \quad (13)$$

TYPE 2

First, the estimated slip amount $G_{UREA\_SLIP}$ is calculated based on a difference between the temporary value $ST_{UREA\_TEMP}$ of the storage amount estimated value and the storage capacity $ST_{UREA\_MAX}$, as shown in the following formula (14).

$$G_{UREA\_SLIP}(k) = \begin{cases} ST_{UREA\_TEMP}(k) - ST_{UREA\_MAX}(k): & ST_{UREA\_TEMP}(k) - ST_{UREA\_MAX}(k) > 0 \\ 0: & ST_{UREA}(k) - ST_{UREA\_MAX}(k) \leq 0 \end{cases} \quad (14)$$

Next, a predetermined switch coefficient $K_{UREA\_NH3\_GAS}$ is multiplied by the estimated slip amount $G_{UREA\_SLIP}$ with a scale of the urea water amount (g), the occupied volume of ammonia generated from the urea water amount is calculated, then this is further divided by the estimated value $V_{EX}$ of the exhaust volume to calculate the slip determination value $NH3_{SLIP\_HAT}$, as shown in the following formula (15).

$$NH3_{SLIP\_HAT}(k) = \frac{(G_{UREA\_SLIP}(k)K_{UREA\_NH3\_GAS})}{V_{EX}(k)} \quad (15)$$

Then, the slip estimation flag $F_{NH3\_SLIP\_HAT}$ can be determined by comparing this slip determination value $NH3_{SLIP\_HAT}$ with the size of the predetermined threshold value $NH3_{SLIP\_JD}$, as shown in the following formula (16).

$$F_{NH3\_SLIP\_HAT}(k) = \begin{cases} 1: & NH3_{SLIP\_HAT}(k) \geq NH3_{SLIP\_JD} \\ 0: & NH3_{SLIP\_HAT}(k) < NH3_{SLIP\_JD} \end{cases} \quad (16)$$

Configuration of Storage Capacity Correction Unit

With the storage capacity correction unit 36, the storage capacity correction value KVNS for correcting the estimated value $ST_{UREA\_MAX}$ of the storage capacity is calculated based on a difference between the occurrence time of ammonia slip determined by the slip determination portion 34 (computing time for which the slip determination flag $F_{NH3\_SLIP}$ was set to "1" from "0") and the occurrence time of ammonia slip estimated by the state estimation unit 35 (computing time for which the slip estimation flag $F_{NH3\_SLIP\_HAT}$ was set to "1" from "0").

Figure 12:
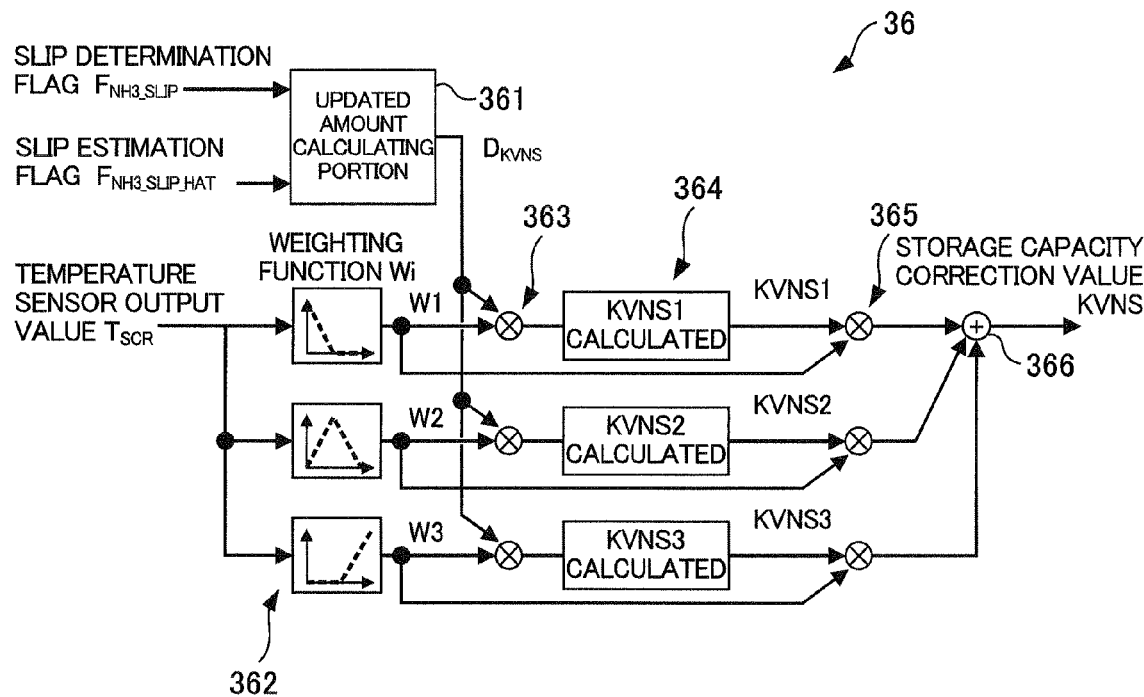
FIG. 12 is a block diagram showing a configuration of a storage capacity correction unit according to the embodiment.

FIG. 12 is a block diagram showing a configuration of the storage capacity correction unit 36.

As has been explained in detail while referring to FIG. 2, the temperature characteristic of the storage capacity changes so as to decline in accordance with the advancement of degradation of the catalyst. In addition, the decline in the storage capacity due to this advancement in degradation is not a uniform decline in all of the temperature regions, but rather shows variation that differs in each temperature region.

Due to adapting to the temperature characteristic of the storage capacity that changes non-linearly with the advancement of such degradation, the storage capacity correction unit 36 calculates the storage capacity correction value KVNS according to the catalyst temperature at this time. More specifically, as explained in detail below, with the storage capacity correction unit 36, a plurality of regions (regions 1, 2 and 3) are set for the catalyst temperature, and a plurality of weighting functions ($W_i$ (i=1, 2, 3)) and a plurality of local correction values ($KVNS_i$ (i=1, 2, 3)) are further set for each of these regions.

With the update amount calculating portion 361, an update amount $D_{KVNS}$ to the storage capacity correction value KVNS is calculated based on the slip determination flag $F_{NH3\_SLIP}$ and the slip estimation flag $F_{NH3\_SLIP\_HAT}$.

With a local correction value calculating portion 364 and a first multiplier 363, the local correction value ($KVNS_i$) of each region is updated based on the above-mentioned update amount $D_{KVNS}$ and the weighting function ($W_i$) of each region calculated in a weighting function setting portion 362.

With a second multiplier 365 and an adder 366, the sum total of products of the above-mentioned local correction values ($KVNS_i$) of each region updated and the values of the weighting functions of each region according to the catalyst temperature is calculated, and this is set as the storage capacity correction value KVNS.

Hereinafter, the configuration of each module will be explained in further detail.

The update amount calculating portion 361 calculates the update amount $D_{KVNS}$ to the storage capacity correction value KVNS, based on a time for which the slip determination flag $F_{NH3\_SLIP}$ was set to "1" from "0" (time for which it was determined that ammonia slip occurred) and a time for which the slip estimation flag $F_{NH3\_SLIP\_HAT}$ was set to "1" from "0" (time for which it was estimated that ammonia slip occurred). Two variations are considered for specific sequences of calculating this update amount $D_{KVNS}$. Hereinafter, sequences of the two variations of TYPE 1 and TYPE 2 will each be explained.

TYPE 1

As shown in the following formula (17), since the storage capacity is considered to be estimated lower than the actual value in a case of the slip estimation flag $F_{NH3\_SLIP\_HAT}$ being "1", irrespective of the slip determination flag $F_{NH3\_SLIP}$ being "0", the update amount $D_{KVNS}$ is set to a positive predetermined value $D_{KVNS\_MOD}$ in order to correct the slip capacity estimated value $ST_{UREA\_MAX}$ to the increased amount side.

On the other hand, since the storage capacity is considered to be estimated higher than the actual value in a case of the slip estimation flag $F_{NH3\_SLIP\_HAT}$ being "0", irrespective of the slip determination flag $F_{NH3\_SLIP}$ being "1", the update amount $D_{KVNS}$ is set to a negative predetermined value $(-D_{KVNS\_MOD})$ in order to correct the storage capacity estimated value $ST_{UREA\_MAX}$ to the reduced amount side.

It should be noted that, in the case of calculating the update amount $D_{KVNS}$ by this sequence of TYPE 1, the computing time of the storage capacity correction unit 36 indicated by the notation (n) is preferably synchronous with the urea injection cycle indicated by the notation (k).

In a case of calculating the update amount $D_{KVNS}$ based on this sequence of TYPE 1, since the storage capacity correction value KVNS is always being continuously updated while there is a difference between the time for which the slip determination flag $F_{NH3\_SLIP}$ is set to "1" and the time for which the slip estimation flag $F_{NH3\_SLIP\_HAT}$ is set to "1", the adapting time can be shortened.

$$D_{KVNS}(n) = \begin{cases} D_{KVNS\_MOD}: & F_{NH3\_SLIP}(k) = 0 \text{ and } F_{NH3\_SLIP\_HAT}(k) = 1 \\ -D_{KVNS\_MOD}: & F_{NH3\_SLIP}(k) = 1 \text{ and } F_{NH3\_SLIP\_HAT}(k) = 0 \\ 0: & \text{in other case} \end{cases} \quad (17)$$

TYPE 2

As shown in the following formula (18), similarly to the above-mentioned TYPE 1, the update amount $D_{KVNS}$ is set to a predetermined amount that is not "0" while there is a difference between the time for which the slip determination flag $F_{NH3\_SLIP}$ is set to "1" and the time for which the slip estimation flag $F_{NH3\_SLIP\_HAT}$ is set to "1" in TYPE 2 as well. However, with TYPE 2, in addition to a case of there being a difference in the time periods for which the two flags $F_{NH3\_SLIP}$ and $F_{NH3\_SLIP\_HAT}$ are set to "1", the update amount $D_{KVNS}$ is set to a value that is not "0" only in a case in which a flag $F_{VNS\_CAL}$ is set to "1".

$$D_{KVNS}(n) = \begin{cases} D_{KVNS\_MOD}: & F_{NH3\_SLIP}(k) = 0 \text{ and } F_{NH3\_SLIP\_HAT}(k) = 1 \\ & \text{and } F_{VNS\_CAL}(k) = 1 \text{ and } F_{VNS\_CAL}(k-1) = 1 \\ -D_{KVNS\_MOD}: & F_{NH3\_SLIP}(k) = 1 \text{ and } F_{NH3\_SLIP\_HAT}(k) = 0 \\ & \text{and } F_{VNS\_CAL}(k) = 1 \text{ and } F_{VNS\_CAL}(k-1) = 1 \\ 0: & \text{in other case} \end{cases} \quad (18)$$

The flag $F_{VNS\_CAL}$ defining this computing timing is set based on the following formula (19). In other words, the flag $F_{VNS\_CAL}$ is set to "1" from "0" when the slip determination flag $F_{NH3\_SLIP}$ is set to "1" from "0", or when the slip estimation flag $F_{NH3\_SLIP\_HAT}$ is set to "1" from "0". Thereafter, the flag $F_{VNS\_CAL}$ is also reset to "0" in response to the slip determination flag $F_{NH3\_SLIP}$ being reset to "0".

$$F_{VNS\_CAL}(k) = \begin{cases} 1 & F_{NH3\_SLIP}(k) = 1 \text{ and } F_{NH3\_SLIP}(k-1) = 0 \\ 1 & F_{NH3\_SLIP\_HAT}(k) = 1 \text{ and } F_{NH3\_SLIP\_HAT}(k-1) = 0 \\ 0 & F_{NH3\_SLIP}(k) = 0 \text{ and } F_{NH3\_SLIP}(k-1) = 0 \\ F_{VNS\_CAL}(k-1): & \text{in other case} \end{cases} \quad (19)$$

Incidentally, under operating conditions in which the temperature change of the selective reduction catalyst is sharp, error easily arises between the slip determination flag $F_{NH3\_SLIP}$ and the slip estimation flag $F_{NH3\_SLIP\_HAT}$. This is because the estimation flag $F_{NH3\_SLIP\_HAT}$ is set based on the storage capacity estimated value $ST_{UREA\_MAX}$, which changes greatly in response to temperature change. As explained above, with TYPE 2, since the update amount $D_{KVNS}$ is set to a value that is not "0" only while the flag $F_{VNS\_CAL}$ is set to "1" during the time when there is a difference in the time periods for which the two flags $F_{NH3\_SLIP}$ and $F_{NH3\_SLIP\_HAT}$ are set to "1", the storage capacity is considered to be corrected by a gain that is small compared to TYPE 1. Therefore, with TYPE 2, the correction precision of the storage capacity under conditions in which the temperature change of the selective reduction catalyst is sharp can be improved in particular, compared to TYPE 1.

Figure 13:
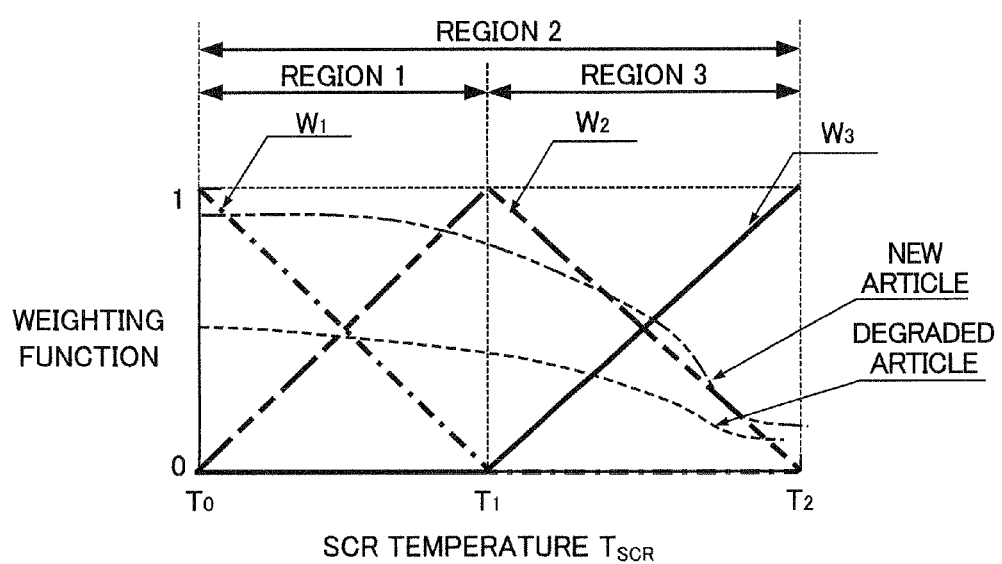
FIG. 13 is a view showing configurations of three weighting functions with the output values of the catalyst temperature sensor as the domains according to the embodiment.

FIG. 13 is a view showing configurations of three weighting functions $W_i$ (1=1, 2, 3) with the output values $T_{SCR}$ of the catalyst temperature sensor as the domains.

As shown in FIG. 13, three regions overlapping each other are set in the domains, and the three weighting functions $W_i$ are set so as to have values that are not 0 in these regions.

More specifically, the domains are divided into region 1 $(T_0, T_1)$, region 2 $(T_0, T_2)$, and region 3 $(T_1, T_2)$. Herein, $T_0 < T_1 < T_2$ is defined. Therefore, region 1 and region 2 overlap in the interval $(T_0, T_1)$, and region 2 and region 3 overlap in the interval $(T_1, T_2)$.

The weighting function $W_1$ is set so as to have a value that is not 0 in region 1 $(T_0, T_1)$. More specifically, the weighting function $W_1$ is set so as to decrease from 1 to 0 in the interval $(T_0, T_1)$.

The weighting function $W_2$ is set so as to have a value that is not 0 in region 2 $(T_0, T_2)$. More specifically, the weighting function $W_2$ is set so as to rise from 0 to 1 in the interval $(T_0, T_1)$ and is set so as to decrease from 1 to 0 in the interval $(T_1, T_2)$. Therefore, the weighting function $W_1$ and the weighting function $W_2$ intersect in the middle of the interval $(T_0, T_1)$.

The weighting function $W_3$ is set so as to have a value that is not 0 in region 3 $(T_1, T_2)$. More specifically, the weighting function $W_3$ is set so as to rise from 0 to 1 in the interval $(T_1, T_2)$. Therefore, the weighting function $W_2$ and the weighting function $W_3$ intersect in the middle of the interval $(T_1, T_2)$.

It should be noted that the number regions defining and the number of weighting functions is not limited to 3, and may be 4 or more. The estimated value of the exhaust volume may be added as a domain defining the weighting functions. In addition, it is preferable to set to the distribution of weighting functions so as to be dense in regions in which the variation amount is large.

Moreover, the weighting functions $W_i$ configured as above are normalized so that a sum total function thereof becomes 1 irrespective of the catalyst temperature sensor output value $T_{SCR}$, as shown in the following formula (20).

$$\sum_{i=1}^{3} W_i(n) = 1 \qquad (20)$$

Returning to FIG. 12, for each weighting function $W_1$, a value is output by the weighting function setting portion 362 according to the catalyst temperature sensor output value $T_{SCR}$.

With the first multiplier 363, the products of multiplying the update amount $D_{KVNS}$ calculated by the update amount calculating portion 361 by each weighting function value output from the weighting function setting portion 362 are output to the local correction value calculating portion 364.

With the local correction value calculating portion 364, first, a forgetting factor $LAMBDA_i$ (1=1, 2, 3) for every local correction value $KVNS_i$ is set as shown in the following formula (21).

More specifically, the forgetting factor $LAMBDA_i$ is set to a setting value $LAMBDA_{FGT\_H}$ (e.g., 0.995) for excess time at an excess time at which the local correction value $KVNS_1$ is larger than the threshold value $KVS_{FGT\_H}$ (e.g., 1.2). The forgetting factor $LAMBDA_i$ is set to a setting value $LAMBDA_{FGT\_L}$ (e.g., 0.990) for deficient time at a deficient time at which the local correction value $KVNS_i$ is smaller than the threshold value $KVS_{FGT\_L}$ (e.g., 0.1). In addition, in a case of the local correction value $KVNS_i$ being between the above-mentioned threshold value $KVS_{FGT\_H}$ and threshold value $KVS_{FGT\_L}$, the forgetting factor $LAMBDA_i$ is set to "1". It should be noted that the threshold value $KVS_{FGT\_L}$ is set to be smaller than a degradation determination threshold value $KVNS_{AGED}$ described later, which is set in order to determine degradation of the selective reduction catalyst.

$$LAMBDA_i(n) = \begin{cases} LAMBDA_{FGT\_H}: & KVNS_i(n-1) \geq KVS_{FGT\_H} \\ 1: & KVS_{FGT\_L} < KVNS_i(n-1) < KVS_{FGT\_H} \\ LAMBDA_{FGT\_L}: & KVNS_i(n-1) \leq KVS_{FGT\_L} \end{cases} \qquad (21)$$

Next, the local correction value $KVNS_i$ is updated based on the forgetting factor $LAMBDA_i(n)$ thus calculated, the previous value $KVNS_i(n-1)$ of the local correction value, the weighting function value $W_i(n)$, and the update amount $D_{KVNS}(n)$.

The local correction value $KVNS_i(n)$ is calculated using the following formula (22). It should be noted that, in a case of the map determining the reference value $ST_{UREA\_MAX\_BS}$ of the storage capacity being constructed using a selective reduction catalyst that is a new article, the initial value of the local correction value $KVNS_i$ is defined as "1". In addition, in a case of correcting the estimated value $ST_{UREA\_MAX}$ by adding the storage capacity correction value KVNS to the reference value $ST_{UREA\_MAX\_BS}$, the initial value of the local correction value $KVNS_i$ is defined as "0".

$$KVNS_i(n) = LAMBDA_i(n)KVNS_i(n-1) + W_i(n)D_{KVNS}(n) \qquad (22)$$

With the second multiplier 365 and the adder 366, the sum total of the products of the local correction values $KVNS_i(n)$ and the weighting function values $W_i(n)$ is calculated as shown in the following formula (23), and this is set as the storage capacity correction value KVNS(n).

$$KVNS(n) = \sum_{i=1}^{3} W_i(n)KVNS_i(n) \qquad (23)$$

Configuration of Catalyst Degradation Determination Unit

With the catalyst degradation determination unit 37, degradation of the selective reduction catalyst is determined by determining the degradation determination flag $F_{SCR\_AGD}$, based on at least any of the parameters correlating to the degradation progression extent of the selective reduction catalyst such as the estimated value $ST_{UREA}$ of the storage capacity, local correction value $KVNS_i$, and storage capacity correction value KVNS. It should be noted that three variations are considered for the specific sequence of determining the degradation of the catalyst. Hereinafter, sequences of the three variations of TYPE 1, TYPE 2 and TYPE 3 will each be explained.

TYPE 1

With TYPE 1, the degradation determination threshold value $KVNS_{AGED}$ for determining degradation of the selective reduction catalyst is set for the storage capacity correction value KVNS. Then, in a case of the storage capacity correction value KVNS becoming smaller than the degradation determination threshold value $KVNS_{AGED}$, it is determined that the selective reduction catalyst has degraded, and the degradation determination flag $F_{SCR\_AGD}$ is set to "1" from "0".

$$F_{SCR\_AGD}(k) = \begin{cases} 0:\text{normal} & KVNS(n) \geq KVNS_{AGED} \\ 1:\text{degraded} & KVNS(n) < KVNS_{AGED} \end{cases} \qquad (24)$$

TYPE 2

With TYPE 2, the degradation determination threshold value $KVNS_{AGED}$ is set for a second component $KVNS_2$, which is defined throughout the entire temperature region, among the local correction value $KVNS_i$. Then, in a case of the second component $KVNS_2$ of the local correction value becoming smaller than the degradation determination threshold value $KVNS_{AGED}$, it is determined that the selective reduction catalyst has degraded, and the degradation determination flag $F_{SCR\_AGD}$ is set to "1" from "0".

$$F_{SCR\_AGD}(k) = \begin{cases} 0:\text{normal} & KVNS_2(n) \geq KVNS_{AGED} \\ 1:\text{degraded} & KVNS_2(n) < KVNS_{AGED} \end{cases} \qquad (25)$$

TYPE 3

With TYPE 3, the degradation determination threshold value $ST_{UREA\_AGED}$ for determining degradation of the selective reduction catalyst is set for the estimated value $ST_{UREA\_MAX}$ of the storage capacity. Then, in a case of the storage capacity estimated value $ST_{UREA\_MAX}$ become smaller than the degradation determination threshold value $ST_{UREA\_AGED}$, it is determined that the selective reduction catalyst has degraded, and the degradation determination flag $F_{SCR\_AGD}$ is set to "1" from "0".

$$F_{SCR\_AGD}(k) = \begin{cases} 0: \text{normal} & ST_{UREA\_MAX}(k) \geq ST_{UREA\_AGED} \\ 1: \text{degraded} & ST_{UREA\_MAX}(k) < ST_{UREA\_AGED} \end{cases} \quad (26)$$

Sequence of Urea Injection Control

Next, a specific sequence of urea injection control will be explained while referring to FIG. 14.

Figure 14:
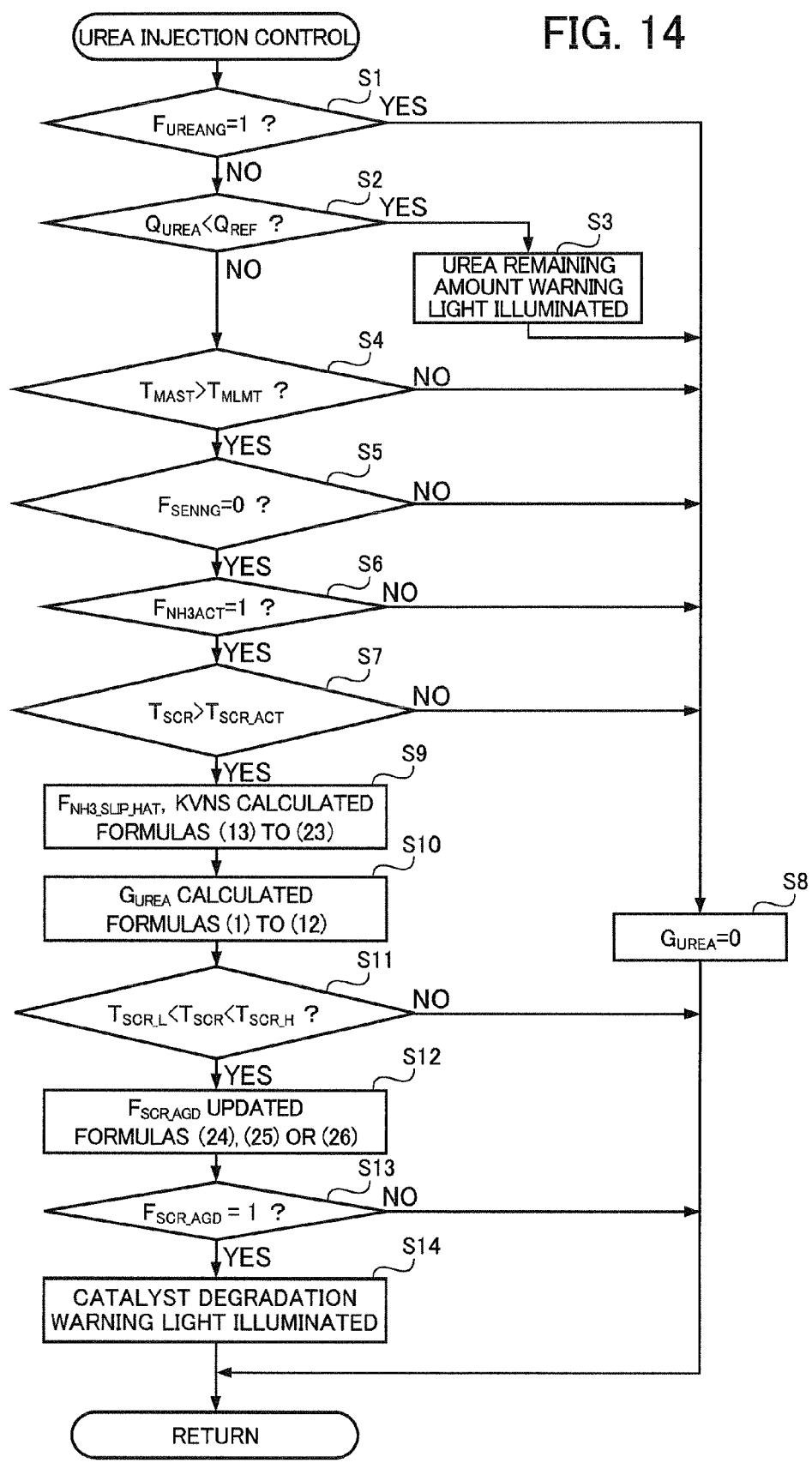
FIG. 14 is a flowchart showing a sequence of urea injection control according to the embodiment.

FIG. 14 is a flowchart showing a sequence of urea injection control executed by an ECU.

In Step S1, it is distinguished whether a urea fault flag $F_{UREANG}$ is "1". This urea fault flag $F_{UREANG}$ is set to "1" when it is determined that the urea injection device has failed in determination processing, which is not illustrated, and is set to "0" at times except for this. In a case of this determination being YES, Step S8 is advanced to, and after the urea injection amount $G_{UREA}$ has been set to "0", this processing ends. In a case of this determination being NO, Step S2 is advanced to.

In Step S2, it is distinguished whether the urea remaining amount $Q_{UREA}$ is less than a predetermined value $Q_{REF}$. This urea remaining amount $Q_{UREA}$ indicates a remaining amount of urea water in the urea tank, and is calculated based on an output of the urea level sensor. In a case of this determination being YES, Step S3 is advanced to, and in a case of being NO, Step S4 is advanced to.

In Step S3, the urea remaining amount warning light is illuminated, and Step S8 is advanced to, and after the urea injection amount $G_{UREA}$ has been set to "0", this processing ends.

In Step S4, it is distinguished whether a catalyst warm-up timer value $T_{MAST}$ is larger than a predetermined value $T_{MLMT}$. This catalyst warm-up timer value $T_{MAST}$ is a value keeping the warm-up time of the selective reduction catalyst after engine startup. In a case of this determination being YES, Step S5 is advanced to. In a case of this determination being NO, Step S8 is advanced to, and after the urea injection amount $G_{UREA}$ has been set to "0", this processing ends.

In Step S5, it is distinguished whether a sensor fault flag $F_{SENNG}$ is "0". This sensor fault flag $F_{SENNG}$ is set to "1" when it is determined that the ammonia sensor or the catalyst temperature sensor has failed in the determination processing, which is not illustrated, and is set to "0" at times except for this. In a case of this determination being YES, Step S6 is advanced to. In a case of this determination being NO, Step S8 is advanced to, and after the urea injection amount $G_{UREA}$ has been set to "0", this processing ends.

In Step S6, it is distinguished whether an ammonia sensor activity flag $F_{NH3ACT}$ is 1. This ammonia sensor activity flag $F_{NH3ACT}$ is set to "1" when it is determined that the ammonia sensor has reached an active state in determination processing, which is not illustrated, and is set to "0" at times except for this. In a case of this determination being YES, Step S7 is advanced to. In a case of this determination being NO, Step S8 is advanced to, and after the urea injection amount $G_{UREA}$ has been set to "0", this processing ends.

In Step S7, it is distinguished whether the catalyst temperature sensor output value $T_{SCR}$ is larger than a predetermined value $T_{SCR\_ACT}$. In a case of this determination being YES, it is determined that the selective reduction catalyst has been activated, and Step S9 is advanced to. In a case of this determination being NO, it is determined that the selective reduction catalyst has not been activated yet and that urea injection should be stopped, Step S8 is advanced to, and after the urea injection amount $G_{UREA}$ has been set to "0", this processing ends.

In Step S9, the slip estimation flag $F_{NH3\_SLIP\_HAT}$ and the storage capacity estimated value KVNS are calculated by the aforementioned state estimation unit and storage capacity correction unit based on formulas (13) to (23).

In Step S10, the urea injection amount $G_{UREA}$ is calculated by the slip determination portion, state estimation unit, reference injection amount calculating portion, and switching injection amount calculating portion based on formulas (1) to (12), and Step S11 is advanced to.

In Step S11, it is distinguished whether the catalyst temperature sensor output value $T_{SCR}$ is within a range of the upper limit value $T_{SCR\_H}$ and the lower limit value $T_{SCR\_L}$. In a case of this determination being YES, it is determined to be a state suited for determining degradation of the selective reduction catalyst, and Step S12 is advanced to. In a case of this determination being NO, this processing ends immediately. It should be noted that the upper limit value $T_{SCR\_H}$ is set to 300° C. and the lower limit value $T_{SCR\_L}$ is set to 230° C., for example.

In Step S12, the degradation determination flag $F_{SCR\_AGD}$ is updated by the catalyst degradation determination unit based on any of formulas (24), (25) and (26), and Step S13 is advanced to.

In Step S13, it is distinguished whether the degradation determination flag $T_{SCR\_AGD}$ is "1". In a case of this determination being YES, Step S14 is advanced to, and after the catalyst degradation warning light has been illuminated, this processing ends. In a case of this determination being NO, this processing ends immediately.

Simulation Results

Next, simulation results of the urea injection control of the present embodiment will be explained in detail while referring to FIGS. 15 to 19.

Herein, taking into account of the two problems exemplified in the above-mentioned (1) and (2), simulation was performed under four different types of conditions. More specifically, CASE 1 is a case in which a selective reduction catalyst that is a new article is used and there is no gain variation in the ammonia sensor, CASE 2 is a case in which the selective reduction catalyst that is a new article is used and there is gain variation in the ammonia sensor, CASE 3 is a case in which a degraded selective reduction catalyst is used and there is no gain variation in the ammonia sensor, and CASE 4 is a case in which a degraded selective reduction catalyst is used and there is gain variation in the ammonia sensor. It should be noted that, for the degraded selective reduction catalyst, a catalyst for which the storage capacity had declined by 30% relative to the new article was used. In addition, a case in which there is gain variation in the ammonia sensor more specifically indicates a case in which the gain has been made to decline by 50%.

TABLE 1

|  | STATE OF THE CATALYST | GAIN VARIATION OF NH$_3$ SENSOR |
| --- | --- | --- |
| CASE 1 | NEW ARTICLE | OFF |
| CASE 2 | NEW ARTICLE | ON |
| CASE 3 | DEGRADED ARTICLE | OFF |
| CASE 4 | DEGRADED ARTICLE | ON |

Figure 15:
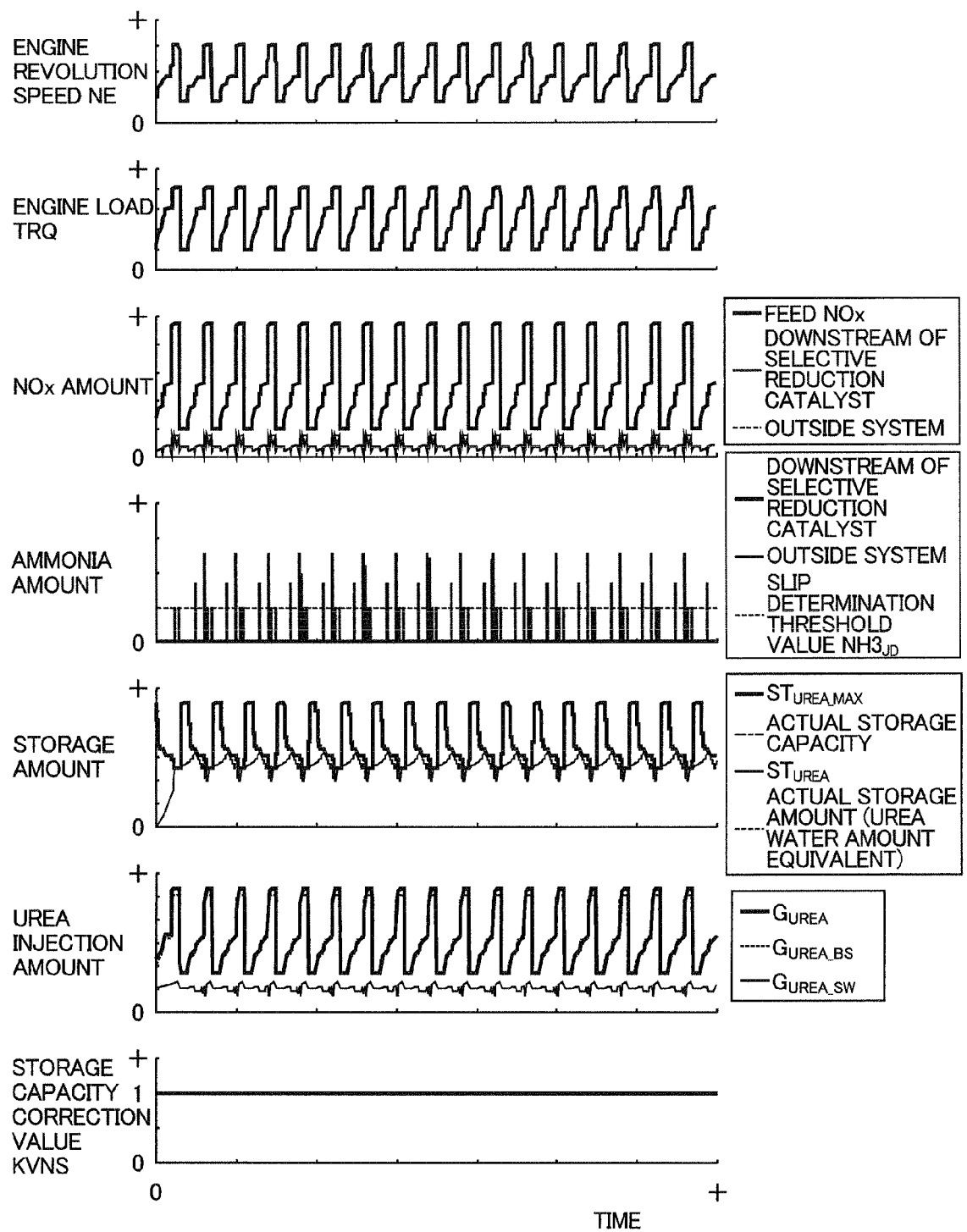
FIG. 15 is charts showing results (CASE 1) of simulation of urea injection control according to the embodiment.

FIG. 15 shows the simulation results of CASE 1. It should be noted that, in the graph of the NOx amount in FIG. 15, the variation in the NOx amount discharged to outside the system indicated by the dotted line is substantially the same as the variation in the NOx amount discharged to downstream of the selective reduction catalyst indicated by the thin solid line. In addition, in the graph of the ammonia amount, the ammonia amount discharged to outside the system indicated by the thin solid line is substantially constant at "0". Moreover, in the graph of the storage amount, the estimated value of the storage capacity indicated by the thick solid line shows variation substantially the same as the actual storage capacity indicated by the dashed line, and the storage amount indicated by the thin solid line shows variation substantially that same as the actual storage amount indicated by the dotted line.

CASE 1 is considered to be a state in which the error of the control system is the smallest, since the selective reduction catalyst is a new article and there is also no gain variation of the ammonia sensor. Therefore, although ammonia slip by the selective reduction catalyst occurs with the operating state of the engine becoming high load, ammonia discharged to outside the system amounts to nothing. In addition, since the actual storage amount is controlled to near the actual storage capacity apart for the duration in which the storage capacity is temporarily increased from low load operation being performed intermittently, the NOx purification rate of the selective reduction catalyst is also maintained to be high.

Moreover, the storage capacity correction value KVNS is maintained at "1", a result of which the error in the estimated value $ST_{UREA\_MAX}$ of the storage capacity relative to the actual storage capacity is also small. This fact is consistent with using a selective reduction catalyst that is a new article.

According to the present embodiment, it is possible to prevent ammonia from being discharged to outside the system while maintaining the NOx purification rate to be high, in spite of using the output value of the ammonia sensor as binary information, as above.

Figure 16:
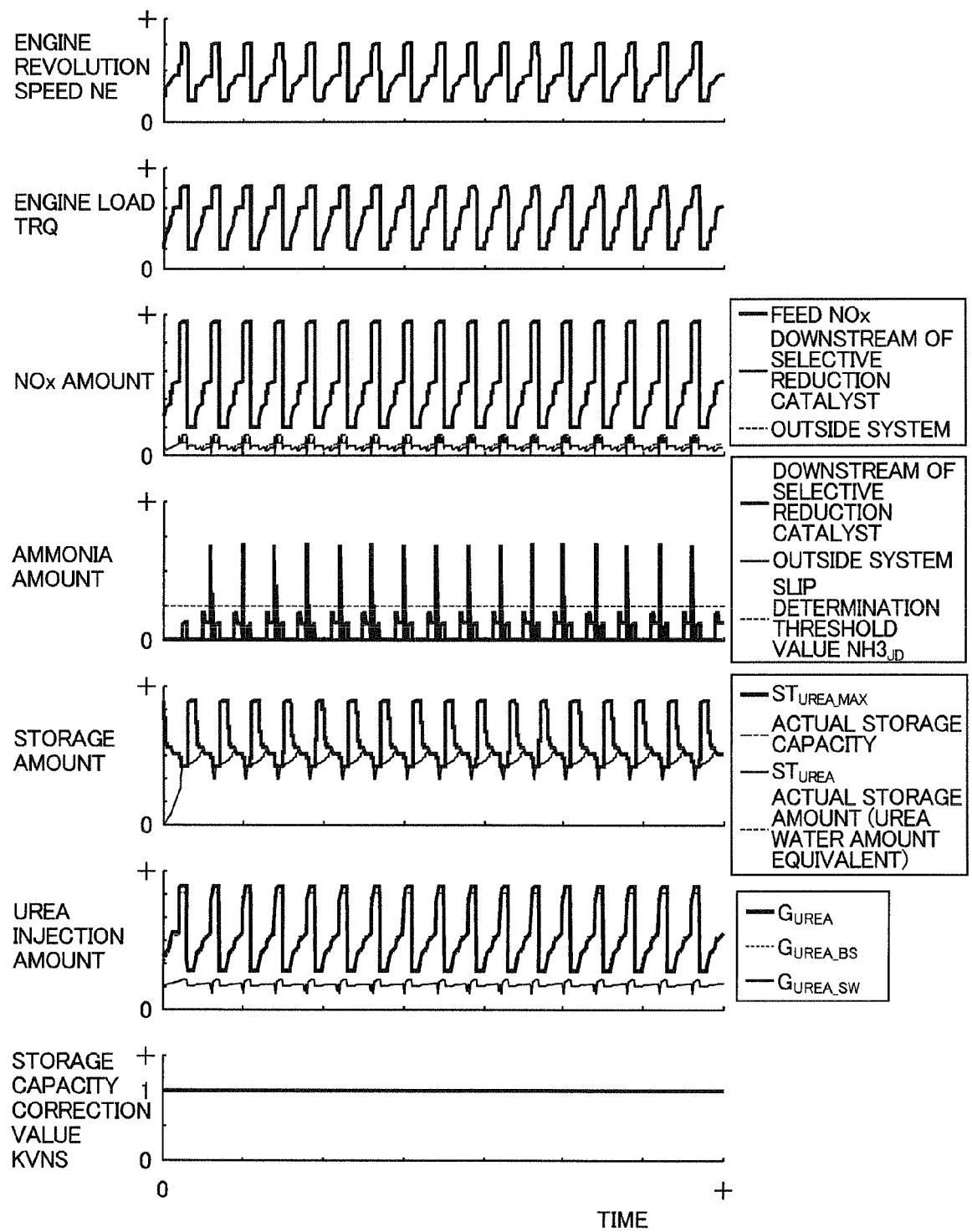
FIG. 16 presents charts showing results (CASE 2) of simulation of urea injection control according to the embodiment.

FIG. 16 shows the simulation results of CASE 2. It should be noted that, in the graph of the NOx amount in FIG. 16, the variation in the NOx amount discharged to outside the system indicated by the dotted line is substantially the same as the variation in the NOx amount discharged to downstream of the selective reduction catalyst indicated by the thin solid line. In addition, in the graph of the ammonia amount, the ammonia amount discharged to outside the system indicated by the thin solid line is substantially constant at "0". Moreover, in the graph of the storage amount, the estimated value of the storage capacity indicated by the thick solid line shows variation substantially the same as the actual storage capacity indicated by the dashed line, and the storage amount indicated by the thin solid line shows variation substantially that same as the actual storage amount indicated by the dotted line.

Although CASE 2 is a case of a state in which gain variation in the ammonia sensor occurs, the effect thereof is small due to using the output value of the ammonia sensor as binary information. Therefore, the simulation results of CASE 2 are substantially the same as the simulation results of CASE 1. Therefore, it has been verified that, according to the present embodiment, even in a case of gain variation in the ammonia sensor having occurred, it is possible to prevent ammonia from discharging to outside the system, while stably maintaining the NOx purification rate to be high.

Figure 17:
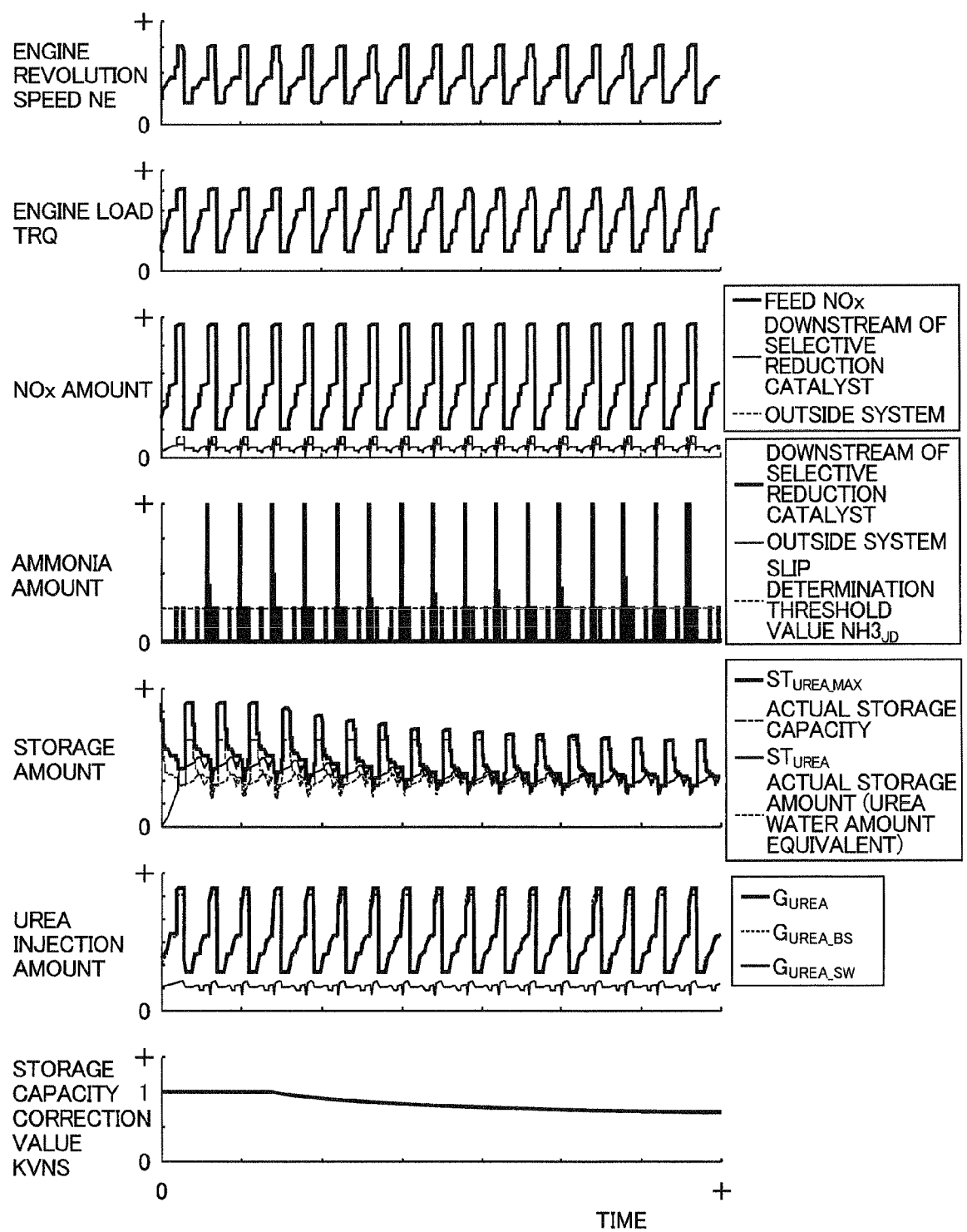
FIG. 17 presents charts showing results (CASE 3) of simulation of urea injection control according to the embodiment.

FIG. 17 shows the simulation results of CASE 3. It should be noted that, in the graph of the NOx amount in FIG. 17, the variation in the NOx amount discharged to outside the system indicated by the dotted line is substantially the same as the variation in the NOx amount discharged to downstream of the selective reduction catalyst indicated by the thin solid line. In addition, in the graph of the ammonia amount, the ammonia amount discharged to outside the system indicated by the thin solid line is substantially constant at "0".

Since CASE 3 is a state in which the selective reduction catalyst has degraded, immediately after operation start, the estimated value $ST_{UREA\_MAX}$ of the storage capacity and the estimated value $ST_{UREA}$ of the storage amount deviate greatly from the actual storage capacity and the actual storage amount. However, the storage capacity correction value KVNS will gradually decrease from "1", and can be brought to the actual value along with the estimated value $ST_{UREA\_MAX}$ of the storage capacity and the estimated value $ST_{UREA}$ of the storage amount by adaptively correcting to a degraded state. Therefore, it has been verified that, according to the present embodiment, even in a state in which the selective reduction catalyst has degraded, it is possible to prevent ammonia from being discharged to outside the system, while stably maintaining the NOx purification rate to be high.

Figure 18:
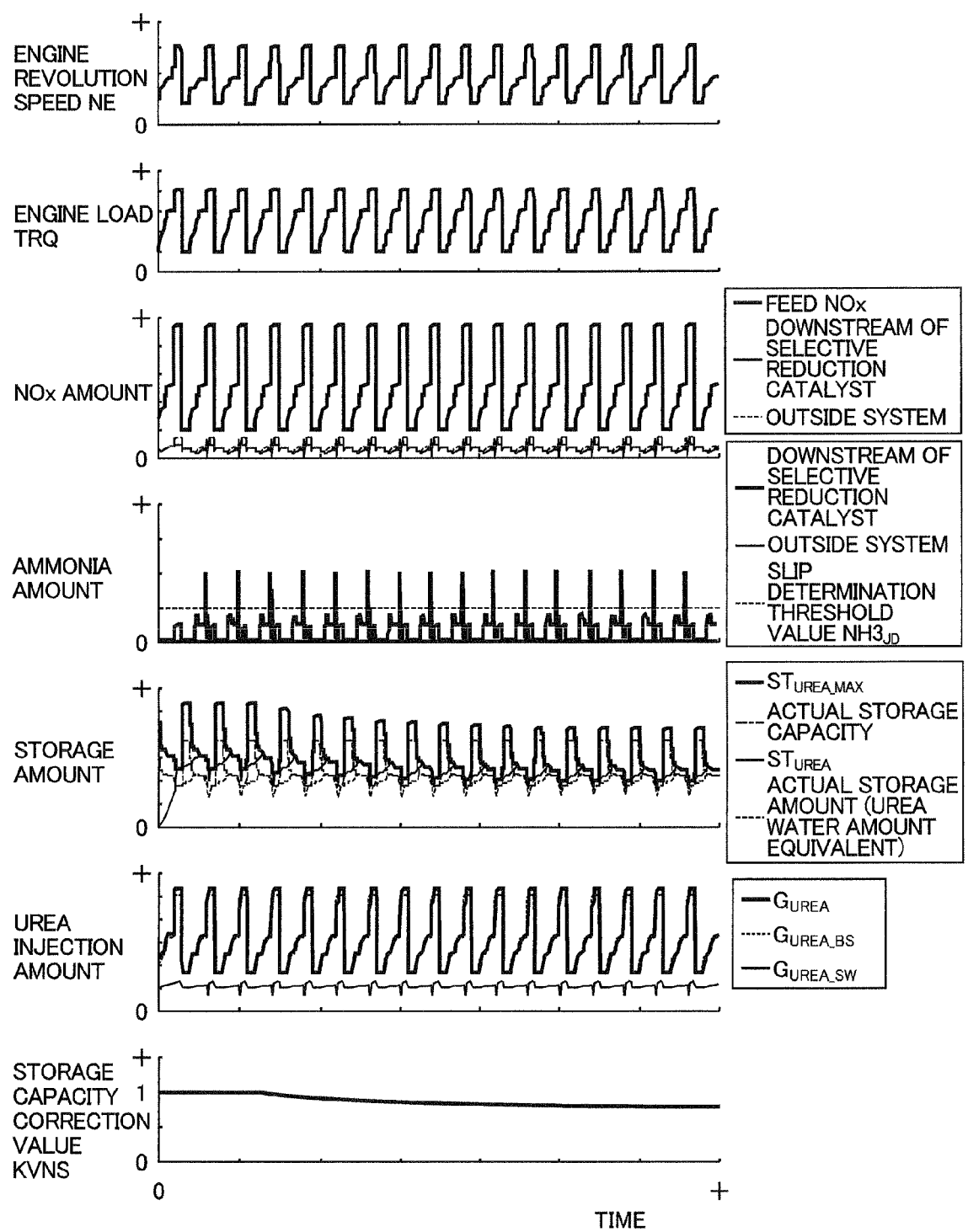
FIG. 18 presents charts showing results (CASE 4) of simulation of urea injection control according to the embodiment.
Figure 19:
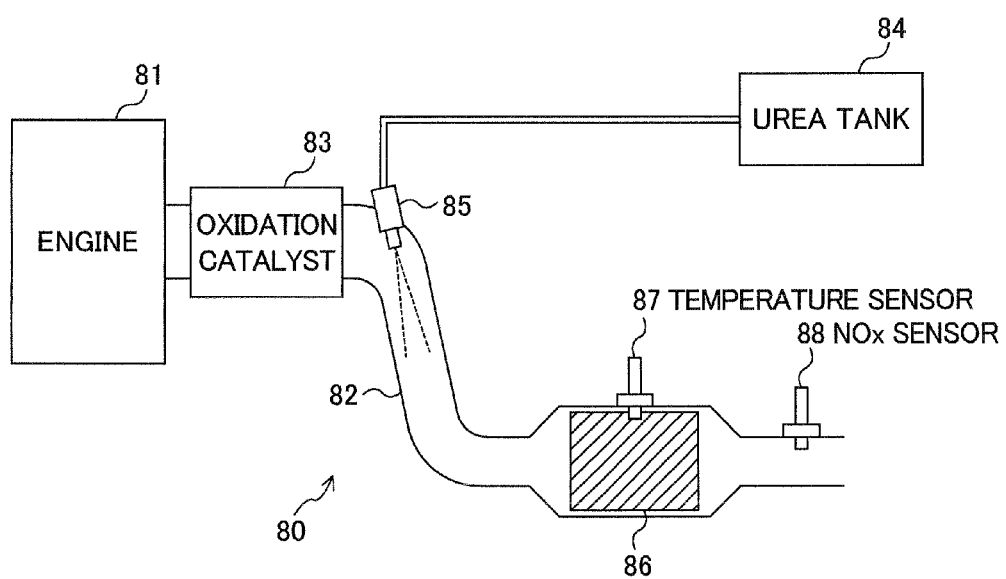
FIG. 19 is a schematic diagram showing a configuration of a conventional exhaust purification system.
Figure 20:
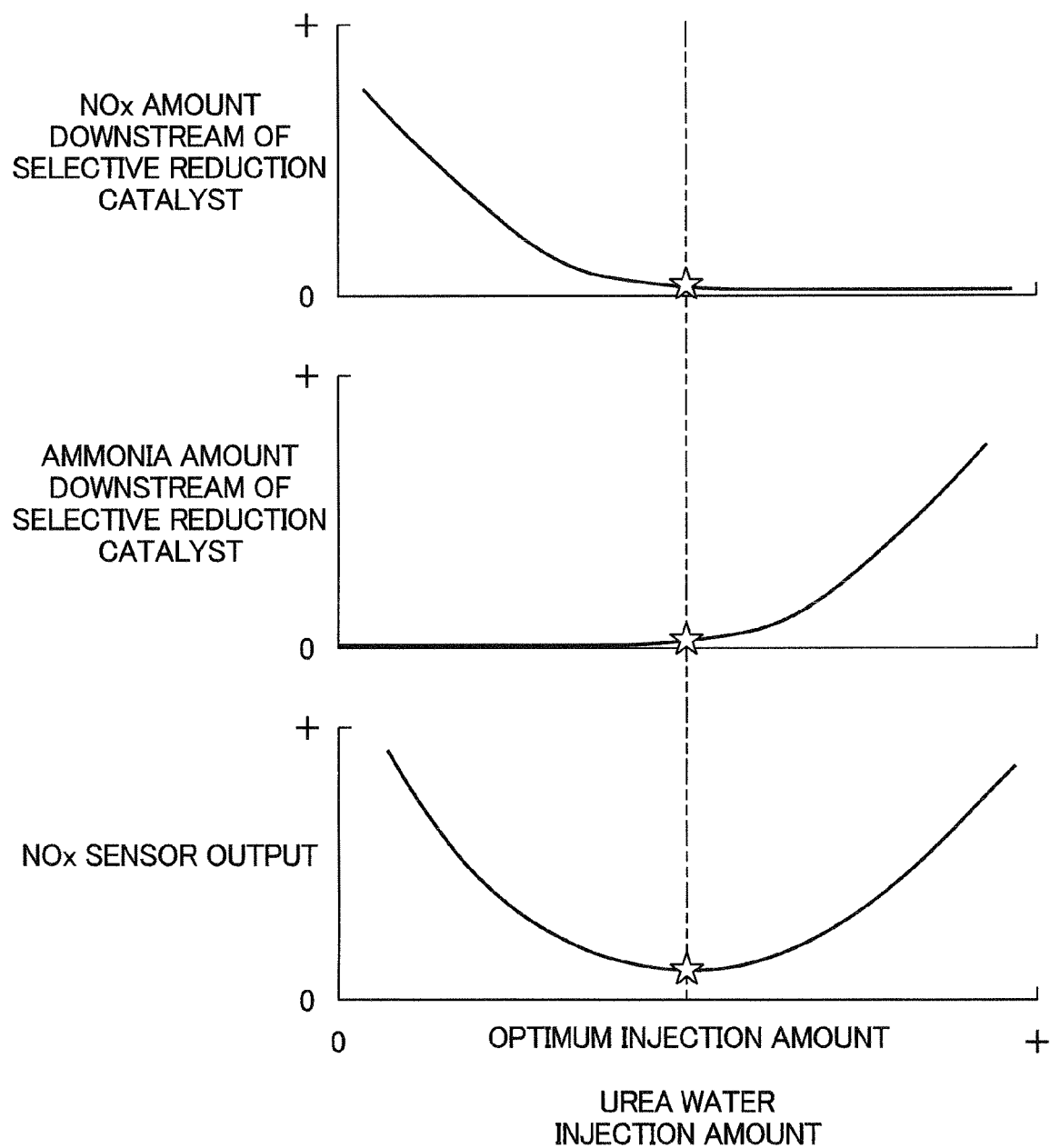
FIG. 20 presents graphs showing relationships between the NOx amount and ammonia amount of exhaust downstream of the selective reduction catalyst and an output value of the NOx sensor for the conventional exhaust purification system.
Figure 21:
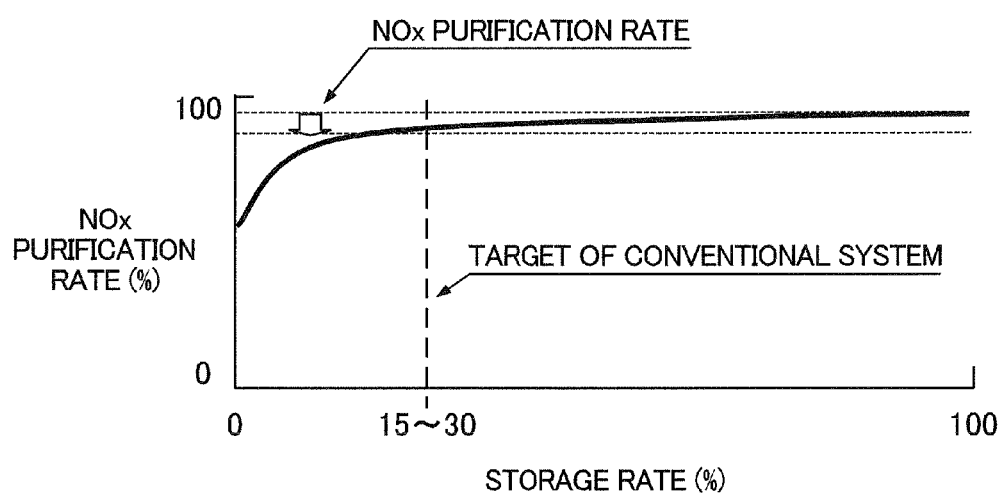
FIG. 21 is a graph showing a relationship between a storage rate and a NOx purification rate of the selective reduction catalyst.

FIG. 18 shows the simulation results of CASE 4. It should be noted that, in the graph of the NOx amount in FIG. 18, the variation in the NOx amount discharged to outside the system indicated by the dotted line is substantially the same as the variation in the NOx amount discharged to downstream of the selective reduction catalyst indicated by the thin solid line. In addition, in the graph of the ammonia amount, the ammonia amount discharged to outside the system indicated by the thin solid line is substantially constant at "0".

CASE 4 is a state in which gain variation in the ammonia sensor occurs and the selective reduction catalyst has degraded, and is considered to be the state in which the error of the control system is the largest. However, since the output value of the ammonia sensor is used as binary information, the effect of there being gain variation in the ammonia sensor is small. Therefore, the simulation results of CASE 4 are substantially the same as the simulation results of CASE 3. Therefore, it has been verified that, according to the present embodiment, it has robustness against gain variation of the ammonia sensor and degradation of the selective reduction catalyst.

According to the present embodiment, there are the following effects.

(1) The reference injection amount $G_{UREA\_BS}$ is calculated based on a parameter (engine revolution speed NE, load parameter TRQ) correlating to the operating state of the engine. The urea injection amount $G_{UREA}$ is decided by decreasing in amount, relative to such a reference injection amount $G_{UREA\_BS}$ in response to having determined that ammonia slip has occurred, and increasing in amount in response to the storage amount estimated value $ST_{UREA}$ falling below the switch storage amount $ST_{UREA\_SW}$. With this, it is possible to continuously maintain the NOx purification rate of the selective reduction catalyst to be high, since the storage amount estimated value $ST_{UREA}$ of the selective reduction catalyst can be controlled so as to oscillate between the switch storage amount $ST_{UREA\_SW}$ and the storage capacity estimated value $ST_{UREA\_MAX}$, while supplying ammonia of an amount required to purify the exhaust according to the operating state of the engine. In addition, at this time, since the occurrence of ammonia slip of the selective reduction catalyst can be done intermittently, it is possible to control the occurrence of ammonia slip while maintaining the NOx purification rate of the selective reduction catalyst to be high.

In addition, binary determination results output from the slip determination unit, and not the output value $NH3_{CONS}$ of the ammonia sensor itself, are used in order to determine the urea injection amount $G_{UREA}$. Therefore, the slip determination portion determines the existence of the occurrence of ammonia slip based on the output value $NH3_{CONS}$ of the ammonia sensor. In addition, the determination result of such an existence of ammonia is considered to not be greatly influenced by the gain variation of the ammonia sensor.

Therefore, it is possible to determine the urea injection amount $G_{UREA}$ without being affected by the gain variation of the ammonia sensor.

(2) The estimated value $ST_{UREA\_MAX}$ of the storage capacity is calculated, and the above-mentioned switch storage amount $ST_{UREA\_SW}$ is set based on this estimated value $ST_{UREA\_MAX}$ of the storage capacity. With this, it is possible to suppress the occurrence of ammonia slip to a minimum, while stably maintaining the NOx purification rate to be high in accordance with the actual state of the selective reduction catalyst, since the switch storage amount $ST_{UREA\_SW}$ can be appropriately set according to the storage capacity, which changes depending on the temperature and extent of degradation of the selective reduction catalyst.

(3) The estimated value $ST_{UREA\_MAX}$ of the storage capacity is corrected according to the difference between the occurrence time of ammonia slip determined based on the output value $NH3_{CONS}$ of the ammonia sensor and the occurrence time of ammonia slip determined based on the estimated value $ST_{UREA}$ of the storage amount. With this, it is possible to further improve the stability of the NOx purification rate and the ability to suppress ammonia slip, since the estimated value $ST_{UREA\_MAX}$ of the storage capacity can be brought to the actual storage capacity, even in a case of material inconsistency and aging in the selective reduction catalyst and ammonia sensor occurring.

(4) The plurality of local correction values $KVNS_i$ are updated based on the difference between the occurrence time of ammonia slip determined by the slip determination portion and the occurrence time of ammonia slip determined by the state estimation unit. Then, the sum total of products of the weighting function values $W_i(n)$ according to the output value $T_{SCR}$ of the catalyst temperature sensor and the above-mentioned local correction values $KVNS_i(n)$ is set as the storage capacity correction value KVNS, and the estimated value $ST_{UREA\_MAX}$ of the storage capacity is corrected based on this storage capacity correction value KVNS. With this, it is possible to adaptively correct the estimated value $ST_{UREA\_MAX}$ of the storage capacity so that the time for which ammonia slip actually occurred and the estimated time for which ammonia slip occurred are in agreement.

(5) By determining degradation of the selective reduction catalyst by the catalyst degradation determination unit, it is possible for the operator to recognize that the selective reduction catalyst has degraded.

It should be noted that the present invention is not limited to the aforementioned embodiment, and various modification are possible.

Although the estimated value $ST_{UREA}$ of the storage amount and the estimated value $ST_{UREA\_MAX}$ of the storage capacity of the selective reduction catalyst were set as values having a scale of the amount of urea water in the above-mentioned embodiment, it is not limited thereto. For example, similar effects are exerted even if set to values having a scale of the amount of ammonia generated from this urea water.

In addition, although an example was exemplified in which the present invention was applied to an exhaust purification system of urea addition-type that uses ammonia as a reducing agent and supplies urea water as an additive to be the source of this reducing agent in the above-mentioned embodiment, it is not limited thereto.

For example, ammonia may be directly supplied without supplying urea water to generate ammonia from this urea water. In addition, the additive to be the source of ammonia is not limited to urea water, and another additive may be used. Moreover, the reducing agent for reducing NOx is not limited to ammonia. The present invention can be applied to an exhaust purification system using hydrocarbons in place of ammonia, for example, as the reducing agent for reducing NOx.

What is claimed is:

1. An exhaust purification system for an internal combustion engine equipped with a selective reduction catalyst provided in an exhaust channel of an internal combustion engine that reduces NOx in exhaust flowing through the exhaust channel under the presence of a reducing agent, and
a reducing agent supply means for supplying a reducing agent or an additive serving as a source to the selective reduction catalyst, the system comprising:
a reducing agent detection means for detecting a reducing agent amount or reducing agent concentration of exhaust in the exhaust channel on a downstream side of the selective reduction catalyst;
a slip determination means for determining an occurrence of reducing agent slip in the selective reduction catalyst based on an output value of the reducing agent detection means;
a storage amount estimation means for calculating an estimated value of a storage amount, with an amount of reducing agent stored in the selective reduction catalyst as the storage amount;
a storage capacity estimation means for calculating an estimated value of a storage capacity, with an amount of reducing agent that can be stored by the selective reduction catalyst as the storage capacity; and
a supply amount determination means for determining a supply amount of the reducing agent supply means,
wherein the supply amount determination means determines a supply amount by decreasing in amount, relative to a reference supply amount calculated based on a parameter correlating to an operating state of the internal combustion engine, in response to having determined that the reducing agent slip has occurred, and increasing in amount in response to an estimated amount of the storage amount falling below a predetermined switch determination value, and
wherein the reference supply amount is determined to be an amount appropriate for a NOx amount discharged from the engine, and the switch determination value is set to a value that is somewhat smaller than the estimated value of the storage capacity.

2. An exhaust purification system for an internal combustion engine according to claim 1, further comprising a slip estimation means for determining the occurrence of reducing agent slip based on the estimated value of the storage amount,
wherein the storage capacity estimation means corrects the estimated value of the storage capacity based on a difference between an occurrence time of reducing agent slip determined by way of the slip determination means and an occurrence time of reducing agent slip determined by way of the slip estimation means.

3. An exhaust purification system for an internal combustion engine equipped with a selective reduction catalyst provided in an exhaust channel of an internal combustion engine that reduces NOx in exhaust flowing through the exhaust channel under the presence of reducing agent, and
a reducing agent supply means for supplying a reducing agent or an additive serving as a source of a reducing agent to the selective reduction catalyst, the system comprising:
a reducing agent detection means for detecting a reducing agent amount or reducing agent concentration of exhaust in the exhaust channel on a downstream side of the selective reduction catalyst;

a storage amount estimation means for calculating an estimated value of a storage amount, with an amount of reducing agent stored in the selective reduction catalyst as the storage amount;

a storage capacity estimation means for calculating an estimated value of a storage capacity, with an amount of reducing agent that can be stored by the selective reduction catalyst as the storage capacity;

a slip determination means for determining an occurrence of reducing agent slip in the selective reduction catalyst based on an output value of the reducing agent detection means;

a slip estimation means for determining the occurrence of the reducing agent slip based on the estimated value of the storage amount; and a supply amount determination means for determining a supply amount of the reducing agent supply means based on a parameter correlating to an operating state of the internal combustion engine, the estimated value of the storage amount, and the estimated value of the storage capacity, wherein the storage capacity estimation means corrects the estimated value of the storage capacity based on a difference between an occurrence time of reducing agent slip determined by way of the slip determination means and an occurrence time of reducing agent slip determined by way of the slip estimation means.

4. An exhaust purification system for an internal combustion engine according to claim 3, wherein a plurality of weighting functions and a plurality of correction values are set for a plurality of regions set for temperature of the selective reduction catalyst, and wherein the storage capacity estimation means updates the plurality of correction values based on a difference between an occurrence time of reducing agent slip determined by way of the slip determination means and an occurrence time of reducing agent slip determined by way of the slip estimation means, sets a sum total of products of the plurality of correction values thus updated and values of the plurality of weighting functions according to the temperature of the selective reduction catalyst as a correction coefficient, and corrects the estimated value of the storage capacity based on the correction coefficient.

5. An exhaust purification system for an internal combustion engine according to claim 4, further comprising a catalyst degradation determination means for determining degradation of the selective reduction catalyst based on at least any of the estimated value of the storage capacity, the plurality of correction values, and the correction coefficient.

* * * * *